(12) United States Patent
He et al.

(10) Patent No.: US 9,787,518 B2
(45) Date of Patent: Oct. 10, 2017

(54) DIGITAL MODULATION METHOD AND APPARATUS

(71) Applicant: Huawei Technologies Co., Ltd., Shenzhen (CN)

(72) Inventors: Xiaoyue He, Shenzhen (CN); Jianhua Liu, Shenzhen (CN); Fanglin Sun, Shenzhen (CN); Quanbo Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/436,421

(22) Filed: Feb. 17, 2017

(65) Prior Publication Data

US 2017/0163464 A1   Jun. 8, 2017

Related U.S. Application Data

(63) Continuation of application No. PCT/CN2014/084812, filed on Aug. 20, 2014.

(51) Int. Cl.
*H04L 5/12* (2006.01)
*H04L 23/02* (2006.01)
*H04L 27/34* (2006.01)
*H04L 1/00* (2006.01)

(52) U.S. Cl.
CPC ........ *H04L 27/3416* (2013.01); *H04L 1/0054* (2013.01)

(58) Field of Classification Search
CPC .......................... H04L 27/3416; H04L 1/0054
See application file for complete search history.

(56) References Cited

FOREIGN PATENT DOCUMENTS

CN              103701752 A    *   4/2014

\* cited by examiner

*Primary Examiner* — Wednel Cadeau
(74) *Attorney, Agent, or Firm* — Leydig, Voit & Mayer, Ltd.

(57) ABSTRACT

Disclosed are a digital modulation method and apparatus. The digital modulation method includes: determining to-be-moved constellation points in a rectangular constellation diagram, where constellation points in the rectangular constellation diagram are distributed at corresponding coordinate points in a plane rectangular coordinate system, the to-be-moved constellation points include S columns of constellation points, in four quadrants of the plane rectangular coordinate system, and the rectangular constellation diagram is a constellation diagram generated by performing quadrature amplitude modulation (QAM) on a data bit stream; dividing to-be-moved constellation points in each of the four quadrants into two constellation point sets according to a bisector of an area between a horizontal coordinate axis and a straight line corresponding to a maximum absolute value of vertical coordinates in the rectangular constellation diagram; and horizontally moving and vertically moving each constellation point set in the four quadrants, to obtain a cross-shaped constellation diagram.

21 Claims, 14 Drawing Sheets

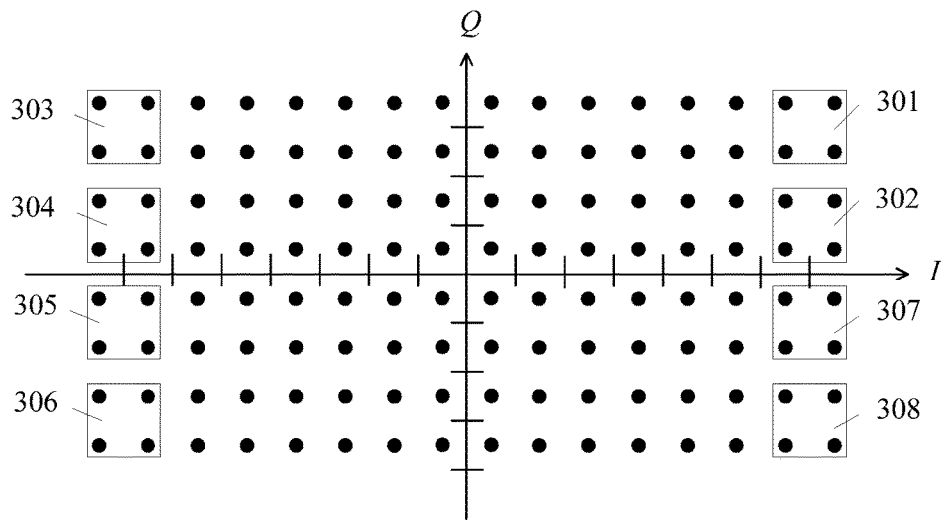

FIG. 3

| Respectively move a first constellation point set and a second constellation point set to a location in the third quadrant and a location in the second quadrant that are at a distance of eight feature distances from their original horizontal coordinates and that are at a distance of a second distance from a vertical coordinate axis, and respectively move a third constellation point set and a fourth constellation point set to a location in the third quadrant and a location in the second quadrant that are at a distance of four feature distances from original horizontal coordinates and that are at a distance of a first distance from the vertical coordinate axis | S401 |

↓

| Respectively move a fifth constellation point set and a sixth constellation point set to a location in the fourth quadrant and a location in the first quadrant that are at a distance of eight feature distances from their original horizontal coordinates and that are at a distance of the second distance from the vertical coordinate axis, and respectively move a seventh constellation point set and an eighth constellation point set to a location in the fourth quadrant and a location in the first quadrant that are at a distance of four feature distances from their original horizontal coordinates and that are at a distance of the first distance from the vertical coordinate axis | S402 |

FIG. 4

S1001 — Respectively move a first constellation point set and a second constellation point set to a location in the first quadrant and a location in the fourth quadrant that are at a distance of four feature distances from their original horizontal coordinates and that are at a distance of a first distance from a vertical coordinate axis, and respectively move a third constellation point set and a fourth constellation point set to a location in the first quadrant and a location in the fourth quadrant that are at a distance of eight feature distances from their original horizontal coordinates and that are at a distance of a second distance from the vertical coordinate axis S1002 — Respectively move a fifth constellation point set and a sixth constellation point set to a location in the second quadrant and a location in the third quadrant that are at a distance of four feature distances from their original horizontal coordinates and that are at a distance of the first distance from the vertical coordinate axis, and respectively move a seventh constellation point set and an eighth constellation point set to a location in the second quadrant and a location in the third quadrant that are at a distance of eight feature distances from their original horizontal coordinates and that are at a distance of the second distance from a vertical coordinate axis

FIG. 10

CONT.
FROM
FIG. 12A

Respectively move the first constellation point set and the second constellation point set to a location in the third quadrant and a location in the second quadrant that are at a distance of eight feature distances from their original horizontal coordinates and that are at a distance of a second distance from a vertical coordinate axis, and respectively move the third constellation point set and the fourth constellation point set to a location in the third quadrant and a location in the second quadrant that are at a distance of four feature distances from their original horizontal coordinates and that are at a distance of a first distance from the vertical coordinate axis    S1204

Respectively move the fifth constellation point set and the sixth constellation point set to a location in the fourth quadrant and a location in the first quadrant that are at a distance of eight feature distances from their original horizontal coordinates and that are at a distance of the second distance from the vertical coordinate axis, and respectively move the seventh constellation point set and the eighth constellation point set to a location in the fourth quadrant and a location in the first quadrant that are at a distance of four feature distances from their original horizontal coordinates and that are at a distance of the first distance from the vertical coordinate axis    S1205

Move a constellation point with a minimum absolute value of a vertical coordinate in each constellation point set in the four quadrants to a location at a distance of one feature distance from a vertical boundary in the rectangular constellation diagram, and keep a relative location between constellation points in each constellation point set in the four quadrants unchanged, to obtain a cross-shaped constellation diagram    S1206

FIG. 12B

DIGITAL MODULATION METHOD AND APPARATUS

CROSS-REFERENCE TO RELATED APPLICATIONS

This application is a continuation of International Application No. PCT/CN2014/084812, filed on Aug. 20, 2014, the disclosure of which is hereby incorporated by reference in its entirety.

TECHNICAL FIELD

Embodiments of the present disclosure relate to the field of communications technologies, and in particular, to a digital modulation method and apparatus.

BACKGROUND

Constellation mapping is a digital modulation technology. A constellation mapping process is mapping a finite field "bit" sequence carrying digital information to a "symbol" sequence suitable for transmission. A value space of each symbol may be a one-dimensional real number space, or a two-dimensional real number space (that is, a complex number space). The constellation mapping includes two elements, that is, a constellation diagram and a constellation point mapping method. The constellation diagram represents a set consisting of all values of output symbols of the constellation mapping. Each point in the constellation diagram is corresponding to a value of an output symbol. The constellation point mapping method represents a specified mapping relationship from an input bit (sequence/group) to a constellation point, or a specified mapping relationship from a constellation point to a bit (sequence/group). Currently, the most common and widely-used constellation diagrams mainly include pulse amplitude modulation (PAM) of the one-dimensional real number space, quadrature amplitude modulation (QAM) of the two-dimensional real number space, and phase shift keying (PSK) modulation.

As a communications system raises an increasingly higher requirement for a transmission rate and spectral efficiency, before performing constellation diagram mapping on a data bit stream by using a QAM technology, a transmit end in an existing communications system usually codes some or all bits in the data bit stream by using a forward error correction code technology. Specifically, the transmit end may actually divide either a coded bit stream or an uncoded bit stream in the data bit stream into a corresponding in-phase (I for short) component and quadrature (Q for short) component, and perform constellation diagram mapping on either the coded bit stream or the uncoded bit stream according to the I component and Q component corresponding to either the coded bit stream or the uncoded bit stream, to obtain a coded constellation diagram and an uncoded constellation diagram. The transmit end further integrates the coded constellation diagram with the uncoded constellation diagram in a constellation diagram merging manner, to obtain a constellation diagram corresponding to the data bit stream. QAM of different orders may be used according to different conditions of a network system. The QAM of different orders is $2^n$ QAM, and different orders are specifically represented by using different integers n. Greater n indicates higher spectrum utilization. If n is an even number, the constellation diagram is a square constellation diagram, for example, 4QAM or 16QAM; or if n is an odd number, the constellation diagram is a rectangular constellation diagram, for example, 32QAM, 128QAM, or 256QAM. A value of n corresponding to the QAM of different orders is a length corresponding to the data bit stream. Because two signals corresponding to the rectangular constellation diagram, that is, an I component and a Q component, are corresponding to asymmetrical powers, and energy at the constellation point is excessively large, the rectangular constellation diagram further needs to be shaped, to obtain a cross-shaped constellation diagram. Correspondingly, a receive end needs to perform decoding and QAM demapping, to obtain the corresponding data bit stream. However, before performing decoding, the receive end further needs to learn bit soft information indicating a bit value probability, that is, a maximum log-likelihood ratio (LLR).

In the prior art, in a cross-shaped constellation diagram corresponding to a rectangular constellation diagram 128QAM obtained according to an odd number of bits, values of coded bits corresponding to one I component but different Q components or one Q component but different I components are different. Therefore, when an LLR required for decoding a bit is to be calculated, quite fine area division needs to be performed on the cross-shaped constellation diagram. As a result, the LLR calculation is relatively complex.

SUMMARY

Embodiments of the present disclosure provides a digital modulation method and apparatus, to resolve a problem that LLR calculation is complex in the prior art.

According to a first aspect, an embodiment of the present disclosure provides a digital modulation method, including:

determining to-be-moved constellation points in a rectangular constellation diagram, where constellation points in the rectangular constellation diagram are distributed at corresponding coordinate points in a plane rectangular coordinate system, the to-be-moved constellation points include S columns of constellation points, with absolute values of horizontal coordinates in a descending order, in four quadrants of the plane rectangular coordinate system, and the rectangular constellation diagram is a constellation diagram generated by performing quadrature amplitude modulation QAM on a data bit stream, where S is a quantity of to-be-moved columns in each quadrant;

dividing to-be-moved constellation points in each of the four quadrants into two constellation point sets according to a bisector of an area between a horizontal coordinate axis and a straight line corresponding to a maximum absolute value of vertical coordinates in the rectangular constellation diagram; and horizontally moving and vertically moving each constellation point set in the four quadrants, to obtain a cross-shaped constellation diagram, where the horizontally moving each constellation point set in the four quadrants includes:

respectively moving two constellation point sets in each of the four quadrants to locations that are in a first quadrant group of the four quadrants and that are at a distance of four or eight feature distances from their original horizontal coordinates, respectively moving, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate of the other constellation point set, and moving, to the second quadrant group, two constellation point sets that are in the first quadrant group and in which a minimum vertical coordinate value of one constellation point set is greater than a maximum vertical coordinate value of the other constellation point set, where the first quadrant group includes the first quadrant and the fourth quadrant, or the second quadrant and the third quadrant, the second quadrant group includes the first quadrant and the second quadrant, or the third quadrant and the fourth quadrant, the feature distance is a distance between two adjacent constellation points in the rectangular constellation diagram, a difference between the first distance and the second distance is equal to S feature distances, and a distance between constellation points with maximum horizontal coordinate values in adjacent constellation point sets in the cross-shaped constellation diagram is equal to S feature distances; and the vertically moving each constellation point set in the four quadrants includes:

moving a constellation point with a minimum absolute value of a vertical coordinate in each constellation point set in the four quadrants to a location at a distance of one feature distance from a vertical boundary in the rectangular constellation diagram, and keeping a relative location between constellation points in each constellation point set in the four quadrants unchanged.

According to the first aspect, in a first possible implementation manner of the first aspect, before the determining to-be-moved constellation points in a rectangular constellation diagram, the method further includes:

obtaining a difference between a column quantity and a row quantity in the rectangular constellation diagram, and dividing an absolute value of the difference by four, to obtain the quantity of to-be-moved columns in each quadrant.

According to the first aspect or the first possible implementation manner of the first aspect, in a second possible implementation manner, the dividing to-be-moved constellation points in each of the four quadrants into two constellation point sets according to a bisector of an area between a horizontal coordinate axis and a straight line corresponding to a maximum absolute value of vertical coordinates in the rectangular constellation diagram includes:

dividing to-be-moved constellation points in the first quadrant of the four quadrants to obtain a first constellation point set and a second constellation point set, dividing to-be-moved constellation points in the second quadrant of the four quadrants to obtain a third constellation point set and a fourth constellation point set, dividing to-be-moved constellation points in the third quadrant of the four quadrants to obtain a fifth constellation point set and a sixth constellation point set, and dividing to-be-moved constellation points in the fourth quadrant of the four quadrants to obtain a seventh constellation point set and an eighth constellation point set, according to the bisector of the area between the horizontal coordinate axis and the straight line corresponding to the maximum absolute value of the vertical coordinates in the rectangular constellation diagram.

According to the second possible implementation manner of the first aspect, in a third possible implementation manner, the respectively moving two constellation point sets in each of the four quadrants to locations that are in a first quadrant group of the four quadrants and that are at a distance of four or eight feature distances from their original horizontal coordinates, respectively moving, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and moving, to the second quadrant group, two constellation point sets that are in the first quadrant group and in which a minimum vertical coordinate value of one constellation point set is greater than a maximum vertical coordinate value of the other constellation point set includes:

respectively moving the first constellation point set and the second constellation point set to a location in the third quadrant and a location in the second quadrant that are at a distance of eight feature distances from their original horizontal coordinates and that are at a distance of the second distance from the vertical coordinate axis, and respectively moving the third constellation point set and the fourth constellation point set to a location in the third quadrant and a location in the second quadrant that are at a distance of four feature distances from their original horizontal coordinates and that are at a distance of the first distance from the vertical coordinate axis; and respectively moving the fifth constellation point set and the sixth constellation point set to a location in the fourth quadrant and a location in the first quadrant that are at a distance of eight feature distances from their original horizontal coordinates and that are at a distance of the second distance from the vertical coordinate axis, and respectively moving the seventh constellation point set and the eighth constellation point set to a location in the fourth quadrant and a location in the first quadrant that are at a distance of four feature distances from their original horizontal coordinates and that are at a distance of the first distance from the vertical coordinate axis.

According to the second possible implementation manner of the first aspect, in a fourth possible implementation manner, the respectively moving two constellation point sets in each of the four quadrants to locations that are in a first quadrant group of the four quadrants and that are at a distance of four or eight feature distances from their original horizontal coordinates, respectively moving, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and moving, to the second quadrant group, two constellation point sets that are in the first quadrant group and in which a minimum vertical coordinate value of one constellation point set is greater than a maximum vertical coordinate value of the other constellation point set includes:

respectively moving the first constellation point set and the second constellation point set to a location in the second quadrant and a location in the third quadrant that are at a distance of eight feature distances from their original horizontal coordinates and that are at a distance of the second distance from the vertical coordinate axis, and respectively moving the third constellation point set and the fourth constellation point set to a location in the second quadrant and a location in the third quadrant that are at a distance of four feature distances from their original horizontal coordinates and that are at a distance of the first distance from the vertical coordinate axis; and respectively moving the fifth constellation point set and the sixth constellation point set to a location in the first quadrant and a location in the fourth quadrant that are at a distance of eight feature distances from their original horizontal coordinates and that are at a distance of the second distance from the vertical coordinate axis, and respectively moving the seventh constellation point set and the eighth constellation point set to a location in the first quadrant and a location in the fourth quadrant that are at a distance of four feature distances from their original horizontal coordinates and that are at a distance of the first distance from the vertical coordinate axis.

According to the second possible implementation manner of the first aspect, in a fifth possible implementation manner, the respectively moving two constellation point sets in each of the four quadrants to locations that are in a first quadrant group of the four quadrants and that are at a distance of four or eight feature distances from their original horizontal coordinates, respectively moving, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and moving, to the second quadrant group, two constellation point sets that are in the first quadrant group and in which a minimum vertical coordinate value of one constellation point set is greater than a maximum vertical coordinate value of the other constellation point set includes:

respectively moving the first constellation point set and the second constellation point set to a location in the fourth quadrant and a location in the first quadrant that are at a distance of four feature distances from their original horizontal coordinates and that are at a distance of the first distance from the vertical coordinate axis, and respectively moving the third constellation point set and the fourth constellation point set to a location in the fourth quadrant and a location in the first quadrant that are at a distance of eight feature distances from their original horizontal coordinates and that are at a distance of the second distance from the vertical coordinate axis; and respectively moving the fifth constellation point set and the sixth constellation point set to a location in the third quadrant and a location in the second quadrant that are at a distance of four feature distances from their original horizontal coordinates and that are at a distance of the first distance from the vertical coordinate axis, and respectively moving the seventh constellation point set and the eighth constellation point set to a location in the third quadrant and a location in the second quadrant that are at a distance of eight feature distances from their original horizontal coordinates and that are at a distance of the second distance from the vertical coordinate axis.

According to the second possible implementation manner of the first aspect, in a sixth possible implementation manner, the respectively moving two constellation point sets in each of the four quadrants to locations that are in a first quadrant group of the four quadrants and that are at a distance of four or eight feature distances from their original horizontal coordinates, respectively moving, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and moving, to the second quadrant group, two constellation point sets that are in the first quadrant group and in which a minimum vertical coordinate value of one constellation point set is greater than a maximum vertical coordinate value of the other constellation point set includes:

respectively moving the first constellation point set and the second constellation point set to a location in the first quadrant and a location in the fourth quadrant that are at a distance of four feature distances from their original horizontal coordinates and that are at a distance of the first distance from the vertical coordinate axis, and respectively moving the third constellation point set and the fourth constellation point set to a location in the first quadrant and a location in the fourth quadrant that are at a distance of eight feature distances from their original horizontal coordinates and that are at a distance of the second distance from the vertical coordinate axis; and respectively moving the fifth constellation point set and the sixth constellation point set to a location in the second quadrant and a location in the third quadrant that are at a distance of four feature distances from their original horizontal coordinates and that are at a distance of the first distance from the vertical coordinate axis, and respectively moving the seventh constellation point set and the eighth constellation point set to a location in the second quadrant and a location in the third quadrant that are at a distance of eight feature distances from their original horizontal coordinates and that are at a distance of the second distance from the vertical coordinate axis.

According to a second aspect, an embodiment of the present disclosure provides a digital modulation apparatus, including:

a determining module, configured to determine to-be-moved constellation points in a rectangular constellation diagram, where constellation points in the rectangular constellation diagram are distributed at corresponding coordinate points in a plane rectangular coordinate system, the to-be-moved constellation points include S columns of constellation points, with absolute values of horizontal coordinates in a descending order, in four quadrants of the plane rectangular coordinate system, and the rectangular constellation diagram is a constellation diagram generated by performing quadrature amplitude modulation QAM on a data bit stream, where S is a quantity of to-be-moved columns in each quadrant;

a division module, configured to divide to-be-moved constellation points in each of the four quadrants into two constellation point sets according to a bisector of an area between a horizontal coordinate axis and a straight line corresponding to a maximum absolute value of vertical coordinates in the rectangular constellation diagram; and a movement module, configured to horizontally move and vertically move each constellation point set in the four quadrants, to obtain a cross-shaped constellation diagram, where the movement module includes:

a horizontal movement unit, configured to: respectively move two constellation point sets in each of the four quadrants to locations that are in a first quadrant group of the four quadrants and that are at a distance of four or eight feature distances from their original horizontal coordinates, respectively move, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and move, to the second quadrant group, two constellation point sets that are in the first quadrant group and in which a minimum vertical coordinate value of one constellation point set is greater than a maximum vertical coordinate value of the other constellation point set, where the first quadrant group includes the first quadrant and the fourth quadrant, or the second quadrant and the third quadrant, the second quadrant group includes the first quadrant and the second quadrant, or the third quadrant and the fourth quadrant, the feature distance is a distance between two adjacent constellation points in the rectangular constellation diagram, a difference between the first distance and the second distance is equal to S feature distances, and a distance between constellation points with maximum horizontal coordinate values in adjacent constellation point sets in the cross-shaped constellation diagram is equal to S feature distances; and a vertical movement unit, configured to: move a constellation point with a minimum absolute value of a vertical coordinate in each constellation point set in the four quadrants to a location at a distance of one feature distance from a vertical boundary in the rectangular constellation diagram, and keep a relative location between constellation points in each constellation point set in the four quadrants unchanged.

According to the second aspect, in a first possible implementation manner of the second aspect, the apparatus further includes:

an obtaining module, configured to: before the determining module determines the to-be-moved constellation points in the rectangular constellation diagram, obtain a difference between a column quantity and a row quantity in the rectangular constellation diagram, and divide an absolute value of the difference by four, to obtain the quantity of to-be-moved columns in each quadrant.

According to the second aspect or the first possible implementation manner of the second aspect, in a second possible implementation manner, the division module is further configured to: divide to-be-moved constellation points in the first quadrant of the four quadrants to obtain a first constellation point set and a second constellation point set, divide to-be-moved constellation points in the second quadrant of the four quadrants to obtain a third constellation point set and a fourth constellation point set, divide to-be-moved constellation points in the third quadrant of the four quadrants to obtain a fifth constellation point set and a sixth constellation point set, and divide to-be-moved constellation points in the fourth quadrant of the four quadrants to obtain a seventh constellation point set and an eighth constellation point set, according to the bisector of the area between the horizontal coordinate axis and the straight line corresponding to the maximum absolute value of the vertical coordinates in the rectangular constellation diagram.

According to the second possible implementation manner of the second aspect, in a third possible implementation manner, the horizontal movement unit is further configured to: respectively move the first constellation point set and the second constellation point set to a location in the third quadrant and a location in the second quadrant that are at a distance of eight feature distances from their original horizontal coordinates and that are at a distance of the second distance from the vertical coordinate axis, respectively move the third constellation point set and the fourth constellation point set to a location in the third quadrant and a location in the second quadrant that are at a distance of four feature distances from their original horizontal coordinates and that are at a distance of the first distance from the vertical coordinate axis, respectively move the fifth constellation point set and the sixth constellation point set to a location in the fourth quadrant and a location in the first quadrant that are at a distance of eight feature distances from their original horizontal coordinates and that are at a distance of the second distance from the vertical coordinate axis, and respectively move the seventh constellation point set and the eighth constellation point set to a location in the fourth quadrant and a location in the first quadrant that are at a distance of four feature distances from their original horizontal coordinates and that are at a distance of the first distance from the vertical coordinate axis.

According to the second possible implementation manner of the second aspect, in a fourth possible implementation manner, the horizontal movement unit is further configured to: respectively move the first constellation point set and the second constellation point set to a location in the second quadrant and a location in the third quadrant that are at a distance of eight feature distances from their original horizontal coordinates and that are at a distance of the second distance from the vertical coordinate axis, respectively move the third constellation point set and the fourth constellation point set to a location in the second quadrant and a location in the third quadrant that are at a distance of four feature distances from their original horizontal coordinates and that are at a distance of the first distance from the vertical coordinate axis, respectively move the fifth constellation point set and the sixth constellation point set to a location in the first quadrant and a location in the fourth quadrant that are at a distance of eight feature distances from their original horizontal coordinates and that are at a distance of the second distance from the vertical coordinate axis, and respectively move the seventh constellation point set and the eighth constellation point set to a location in the first quadrant and a location in the fourth quadrant that are at a distance of four feature distances from their original horizontal coordinates and that are at a distance of the first distance from the vertical coordinate axis.

According to the second possible implementation manner of the second aspect, in a fifth possible implementation manner, the horizontal movement unit is further configured to: respectively move the first constellation point set and the second constellation point set to a location in the fourth quadrant and a location in the first quadrant that are at a distance of four feature distances from their original horizontal coordinates and that are at a distance of the first distance from the vertical coordinate axis, respectively move the third constellation point set and the fourth constellation point set to a location in the fourth quadrant and a location in the first quadrant that are at a distance of eight feature distances from their original horizontal coordinates and that are at a distance of the second distance from the vertical coordinate axis, respectively move the fifth constellation point set and the sixth constellation point set to a location in the third quadrant and a location in the second quadrant that are at a distance of four feature distances from their original horizontal coordinates and that are at a distance of the first distance from the vertical coordinate axis, and respectively move the seventh constellation point set and the eighth constellation point set to a location in the third quadrant and a location in the second quadrant that are at a distance of eight feature distances from their original horizontal coordinates and that are at a distance of the second distance from the vertical coordinate axis.

According to the second possible implementation manner of the second aspect, in a sixth possible implementation manner, the horizontal movement unit is further configured to: respectively move the first constellation point set and the second constellation point set to a location in the first quadrant and a location in the fourth quadrant that are at a distance of four feature distances from their original horizontal coordinates and that are at a distance of the first distance from the vertical coordinate axis, respectively move the third constellation point set and the fourth constellation point set to a location in the first quadrant and a location in the fourth quadrant that are at a distance of eight feature distances from their original horizontal coordinates and that are at a distance of the second distance from the vertical coordinate axis, respectively move the fifth constellation point set and the sixth constellation point set to a location in the second quadrant and a location in the third quadrant that are at a distance of four feature distances from their original horizontal coordinates and that are at a distance of the first distance from the vertical coordinate axis, and respectively move the seventh constellation point set and the eighth constellation point set to a location in the second quadrant and a location in the third quadrant that are at a distance of eight feature distances from their original horizontal coordinates and that are at a distance of the second distance from the vertical coordinate axis.

According to a third aspect, an embodiment of the present disclosure provides a digital modulation apparatus, including a receiver, a processor, and a transmitter, where the processor is configured to: determine to-be-moved constellation points in a rectangular constellation diagram, divide to-be-moved constellation points in each of the four quadrants into two constellation point sets according to a bisector of an area between a horizontal coordinate axis and a straight line corresponding to a maximum absolute value of vertical coordinates in the rectangular constellation diagram, and horizontally move and vertically move each constellation point set in the four quadrants, to obtain a cross-shaped constellation diagram, where constellation points in the rectangular constellation diagram are distributed at corresponding coordinate points in a plane rectangular coordinate system, the to-be-moved constellation points include S columns of constellation points, with absolute values of horizontal coordinates in a descending order, in the four quadrants of the plane rectangular coordinate system, and the rectangular constellation diagram is a constellation diagram generated by performing quadrature amplitude modulation QAM on a data bit stream, where S is a quantity of to-be-moved columns in each quadrant;

the processor is specifically configured to: respectively move two constellation point sets in each of the four quadrants to locations that are in a first quadrant group of the four quadrants and that are at a distance of four or eight feature distances from their original horizontal coordinates, respectively move, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and move, to the second quadrant group, two constellation point sets that are in the first quadrant group and in which a minimum vertical coordinate value of one constellation point set is greater than a maximum vertical coordinate value of the other constellation point set, where the first quadrant group includes the first quadrant and the fourth quadrant, or the second quadrant and the third quadrant, the second quadrant group includes the first quadrant and the second quadrant, or the third quadrant and the fourth quadrant, the feature distance is a distance between two adjacent constellation points in the rectangular constellation diagram; a difference between the first distance and the second distance is equal to S feature distances, and a distance between constellation points with maximum horizontal coordinate values in adjacent constellation point sets in the cross-shaped constellation diagram is equal to S feature distances; and the processor is further configured to: move a constellation point with a minimum absolute value of a vertical coordinate in each constellation point set in the four quadrants to a location at a distance of one feature distance from a vertical boundary in the rectangular constellation diagram, and keep a relative location between constellation points in each constellation point set in the four quadrants unchanged.

According to the third aspect, in a first possible implementation manner of the third aspect, the processor is further configured to: before determining the to-be-moved constellation points in the rectangular constellation diagram, obtain a difference between a column quantity and a row quantity in the rectangular constellation diagram, and divide an absolute value of the difference by four, to obtain the quantity of to-be-moved columns in each quadrant.

According to the third aspect or the first possible implementation manner of the third aspect, in a second possible implementation manner of the third aspect, the processor is further configured to: divide to-be-moved constellation points in the first quadrant of the four quadrants to obtain a first constellation point set and a second constellation point set, divide to-be-moved constellation points in the second quadrant of the four quadrants to obtain a third constellation point set and a fourth constellation point set, divide to-be-moved constellation points in the third quadrant of the four quadrants to obtain a fifth constellation point set and a sixth constellation point set, and divide to-be-moved constellation points in the fourth quadrant of the four quadrants to obtain a seventh constellation point set and an eighth constellation point set, according to the bisector of the area between the horizontal coordinate axis and the straight line corresponding to the maximum absolute value of the vertical coordinates in the rectangular constellation diagram.

According to the second possible implementation manner of the third aspect, in a third possible implementation manner, the processor is further configured to: respectively move the first constellation point set and the second constellation point set to a location in the third quadrant and a location in the second quadrant that are at a distance of eight feature distances from their original horizontal coordinates and that are at a distance of the second distance from the vertical coordinate axis, respectively move the third constellation point set and the fourth constellation point set to a location in the third quadrant and a location in the second quadrant that are at a distance of four feature distances from their original horizontal coordinates and that are at a distance of the first distance from the vertical coordinate axis, respectively move the fifth constellation point set and the sixth constellation point set to a location in the fourth quadrant and a location in the first quadrant that are at a distance of eight feature distances from their original horizontal coordinates and that are at a distance of the second distance from the vertical coordinate axis, and respectively move the seventh constellation point set and the eighth constellation point set to a location in the fourth quadrant and a location in the first quadrant that are at a distance of four feature distances from their original horizontal coordinates and that are at a distance of the first distance from the vertical coordinate axis.

According to the second possible implementation manner of the third aspect, in a fourth possible implementation manner, the processor is further configured to: respectively move the first constellation point set and the second constellation point set to a location in the second quadrant and a location in the third quadrant that are at a distance of eight feature distances from their original horizontal coordinates and that are at a distance of the second distance from the vertical coordinate axis, respectively move the third constellation point set and the fourth constellation point set to a location in the second quadrant and a location in the third quadrant that are at a distance of four feature distances from their original horizontal coordinates and that are at a distance of the first distance from the vertical coordinate axis, respectively move the fifth constellation point set and the sixth constellation point set to a location in the first quadrant and a location in the fourth quadrant that are at a distance of eight feature distances from their original horizontal coordinates and that are at a distance of the second distance from the vertical coordinate axis, and respectively move the seventh constellation point set and the eighth constellation point set to a location in the first quadrant and a location in the fourth quadrant that are at a distance of four feature distances from their original horizontal coordinates and that are at a distance of the first distance from the vertical coordinate axis.

According to the second possible implementation manner of the third aspect, in a fifth possible implementation manner, the processor is further configured to: respectively move the first constellation point set and the second constellation point set to a location in the fourth quadrant and a location in the first quadrant that are at a distance of four feature distances from their original horizontal coordinates and that are at a distance of the first distance from the vertical coordinate axis, respectively move the third constellation point set and the fourth constellation point set to a location in the fourth quadrant and a location in the first quadrant that are at a distance of eight feature distances from their original horizontal coordinates and that are at a distance of the second distance from the vertical coordinate axis, respectively move the fifth constellation point set and the sixth constellation point set to a location in the third quadrant and a location in the second quadrant that are at a distance of four feature distances from their original horizontal coordinates and that are at a distance of the first distance from the vertical coordinate axis, and respectively move the seventh constellation point set and the eighth constellation point set to a location in the third quadrant and a location in the second quadrant that are at a distance of eight feature distances from their original horizontal coordinates and that are at a distance of the second distance from the vertical coordinate axis.

According to the second possible implementation manner of the third aspect, in a sixth possible implementation manner, the processor is further configured to: respectively move the first constellation point set and the second constellation point set to a location in the first quadrant and a location in the fourth quadrant that are at a distance of four feature distances from their original horizontal coordinates and that are at a distance of the first distance from the vertical coordinate axis, respectively move the third constellation point set and the fourth constellation point set to a location in the first quadrant and a location in the fourth quadrant that are at a distance of eight feature distances from their original horizontal coordinates and that are at a distance of the second distance from the vertical coordinate axis, respectively move the fifth constellation point set and the sixth constellation point set to a location in the second quadrant and a location in the third quadrant that are at a distance of four feature distances from their original horizontal coordinates and that are at a distance of the first distance from the vertical coordinate axis, and respectively move the seventh constellation point set and the eighth constellation point set to a location in the second quadrant and a location in the third quadrant that are at a distance of eight feature distances from their original horizontal coordinates and that are at a distance of the second distance from the vertical coordinate axis.

According to the digital modulation method and apparatus provided in the embodiments of the present disclosure, S columns of constellation points, with absolute values of horizontal coordinates in a descending order, in each quadrant of a plane rectangular coordinate system are determined as to-be-moved constellation points; to-be-moved constellation points in each of four quadrants are divided into two constellation point sets according to a bisector of an area between a horizontal coordinate axis and a straight line corresponding to a maximum absolute value of vertical coordinates; two constellation point sets in each quadrant are respectively moved to locations that are in a first quadrant group and that are at a distance of four or eight feature distances from their original horizontal coordinates; two constellation point sets that are in a second quadrant group and in which a minimum vertical coordinate value of one constellation point set is greater than a maximum vertical coordinate value of the other constellation point set are respectively moved to a location at a distance of a first distance from a vertical coordinate axis and a location at a distance of a second distance from the vertical coordinate axis that are in a quadrant; two constellation point sets that are in the first quadrant group and in which a minimum vertical coordinate of one constellation point set is greater than a maximum vertical coordinate of the other constellation point set are moved to the second quadrant group; and a constellation point with a minimum absolute value of a vertical coordinate in each constellation point set is moved to a location at a distance of one feature distance from a vertical boundary in a rectangular constellation diagram, and a relative location between constellation points in each constellation point set is kept unchanged, to obtain a cross-shaped constellation diagram. Therefore, values of coded bits corresponding to one I component but different Q components or one Q component but different I components in the obtained cross-shaped constellation diagram are the same, so as to simplify LLR calculation complexity.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

FIG. 3 is a schematic structural diagram of constellation point set division during digital modulation on a constellation diagram according to Embodiment 2 of the present disclosure;

FIG. 4 is a flowchart of a digital modulation method according to Embodiment 3 of the present disclosure;

FIG. 10 is a flowchart of a digital modulation method according to Embodiment 6 of the present disclosure;

FIG. 12A and FIG. 12B are a flowchart of digital modulation method according to Embodiment 7 of the present disclosure;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

Embodiment 1

Figure 1:
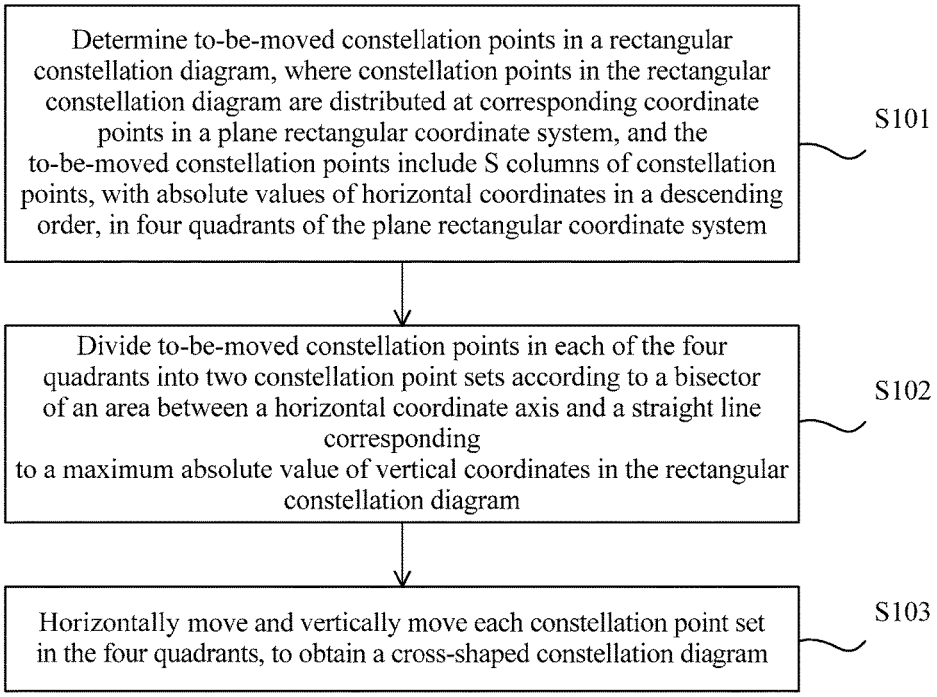
FIG. 1 is a flowchart of a digital modulation method according to Embodiment 1 of the present disclosure.

This embodiment of the present disclosure provides a digital modulation method. A solution provided in this embodiment may be executed by a soft information calculation module of a receive end, or may be executed by a constellation mapping module of a transmit end after coding is performed. The soft information calculation module and the constellation mapping module may respectively exist inside the receive end and the transmit end in a form of software and/or hardware (such as a processor). FIG. 1 is a flowchart of a digital modulation method according to Embodiment 1 of the present disclosure. As shown in FIG. 1, the method specifically includes the following steps.

Step 101: Determine to-be-moved constellation points in a rectangular constellation diagram, where constellation points in the rectangular constellation diagram are distributed at corresponding coordinate points in a plane rectangular coordinate system, and the to-be-moved constellation points include S columns of constellation points, with absolute values of horizontal coordinates in a descending order, in four quadrants of the plane rectangular coordinate system.

The rectangular constellation diagram is a constellation diagram generated by performing QAM on a data bit stream, and S is a quantity of to-be-moved columns in each quadrant.

Specifically, the data bit stream includes a coded bit stream and an uncoded bit stream. The coded bit stream may be l low-order bits of the data bit stream, and the uncoded bit stream is high-order bits of the data bit stream, and l may be an even number such as 2, 4, or 6. Performing QAM modulation on the data bit stream is actually separately performing QAM according to the coded bit stream and the uncoded bit stream in the data bit stream, to obtain a coded constellation diagram and an uncoded constellation diagram. Then, the constellation diagram corresponding to the data bit stream is obtained in a preset constellation diagram integration manner according to the coded constellation diagram and the uncoded constellation diagram. For example, the coded bit stream may be a coded bit stream obtained by means of coding by using a low-density parity-check (LDPC) forward error correction code technology.

Assuming that the data bit stream is seven bits, l may be any one of 2, 4, or 6. Assuming that l is 4, the coded bit stream may be four low-order bits, and the uncoded bit stream is three high-order bits. The coded bit stream may be represented as $c_3c_2c_1c_0$, and the uncoded bit stream may be represented as $d_2d_1d_0$. That is, the data bit stream is $d_2d_1d_0c_3c_2c_1c_0$. The coded bit stream in the data bit stream may include an $I_c$ component bit stream and a $Q_c$ component bit stream. The $I_c$ component bit stream may be $c_3c_2$, and the $Q_c$ component bit stream may be $c_1c_0$. The uncoded bit stream in the data bit stream may include an $I_d$ component bit stream and a $Q_d$ component bit stream. The $I_d$ component bit stream may be $d_2d_1$, and the $Q_d$ component bit stream may be $d_0$.

The coded constellation diagram may be obtained by performing QAM according to the coded bit stream. Actually, modulation is performed according to the $I_c$ component bit stream and the $Q_c$ component bit stream. The obtained coded constellation diagram may be represented as, for example, $<I_c, Q_c>$. The coded constellation diagram is actually a 16QAM constellation diagram. The uncoded constellation diagram may be obtained by performing QAM according to the uncoded bit stream. Actually, modulation is performed according to the $I_d$ component bit stream and the $Q_d$ component bit stream. The obtained uncoded constellation diagram may be represented as, for example, $<I_d, Q_d>$. The uncoded constellation diagram is actually an 8QAM constellation diagram.

For example, the preset constellation diagram integration manner may be shown in the following formula:

$$<I,Q>=2^{1/2}*<I_d,Q_d>+<I_c,Q_c> \qquad (1)$$

where l is a quantity of coded bits, and the constellation diagram corresponding to the data bit stream may be represented as $<I, Q>$, and may be obtained according to $<I_c, Q_c>$ and $<I_d, Q_d>$ by using the foregoing formula (1).

Because the data bit stream is seven bits, an I component bit stream of the data bit stream includes the $I_c$ component bit stream and the $I_d$ component bit stream, and may be represented as $d_2d_1c_3c_2$, and a Q component bit stream includes the $Q_c$ component bit stream and the $Q_d$ component bit stream, and may be represented as $d_0c_1c_0$. Because the I component bit stream and the Q component bit stream are unequal, the finally obtained constellation diagram corresponding to the data bit stream is a rectangular constellation diagram, and the rectangular constellation diagram may be a 128QAM constellation diagram.

The constellation points in the rectangular constellation diagram are distributed at the corresponding coordinate points in the plane rectangular coordinate system. That is, one constellation point is corresponding to one coordinate point. In the plane rectangular coordinate system, a horizontal coordinate is corresponding to an I component of a constellation point in the rectangular constellation diagram, and a vertical coordinate is corresponding to a Q component of a constellation point in the rectangular constellation diagram. That is, different horizontal coordinate values are corresponding to different I component bit streams, and different vertical coordinate values are corresponding to different Q component bit streams. Therefore, different data bit streams have coordinates of different horizontal coordinate values and/or different vertical coordinate values, and may be in corresponding coordinate locations in the plane rectangular coordinate system.

The to-be-moved constellation points in the rectangular constellation diagram may be evenly distributed in four different quadrants in the plane rectangular coordinate system, and be located on outermost parts of the four quadrants. Because a size of the I component bit stream is greater than that of the Q component bit stream, a horizontal amplitude of the I component in the rectangular constellation diagram is relatively large. That is, a column quantity of constellation points in the rectangular constellation diagram is greater than a row quantity. Therefore, to-be-moved constellation points in each quadrant are located on a horizontal outermost part of the rectangular constellation diagram, that is, in S columns with absolute values of horizontal coordinates in a descending order. Specifically, a column quantity corresponding to the to-be-moved constellation points in each quadrant may be determined according to the column quantity and the row quantity in the rectangular constellation diagram, or may be determined according to sizes of the corresponding I component bit stream and Q component bit stream during constellation diagram mapping on the data bit stream.

Step 102: Divide to-be-moved constellation points in each of the four quadrants into two constellation point sets according to a bisector of an area between a horizontal coordinate axis and a straight line corresponding to a maximum absolute value of vertical coordinates in the rectangular constellation diagram.

Specifically, the maximum absolute value of vertical coordinates in the rectangular constellation diagram may be determined according to a preset feature distance. Assuming that the I component bit stream in the data bit stream is four bits, there may be $2^4$ columns in the rectangular constellation diagram, the corresponding Q component bit stream is three bits, and the row quantity in the rectangular constellation diagram is $2^3$. If the feature distance, that is, a distance between two adjacent constellation points, is N, in the rectangular constellation diagram, the $2^4$ columns of constellation points may be evenly distributed according to the feature distance N by using a vertical coordinate axis as a center, and the $2^3$ rows of constellation points may be evenly distributed according to the feature distance N by using the horizontal coordinate axis as a center. Therefore, in the rectangular constellation diagram, a maximum horizontal coordinate value may be $$\frac{2^4-1}{2}N,$$

a minimum horizontal coordinate value may be $$-\frac{2^4-1}{2}N.$$

Correspondingly, a maximum vertical coordinate value may be $$\frac{2^3-1}{2}N,$$

and a minimum vertical coordinate value may be $$-\frac{2^3-1}{2}N.$$

The bisector of the area between the horizontal coordinate axis and the straight line corresponding to the maximum absolute value of the vertical coordinates in the rectangular constellation diagram includes: a bisector of an area between the horizontal coordinate axis and a straight line corresponding to the maximum vertical coordinate value, and a bisector of an area between the horizontal coordinate axis and a straight line corresponding to the minimum vertical coordinate value. By using the horizontal coordinate axis as a symmetry axis, the bisector of the area between the horizontal coordinate axis and the straight line corresponding to the maximum vertical coordinate value is symmetrical with the bisector of the area between the horizontal coordinate axis and the straight line corresponding to the minimum vertical coordinate value. The bisector of the area between the horizontal coordinate axis and the straight line corresponding to the maximum vertical coordinate value may be a straight line that is perpendicular to the vertical coordinate axis and that is at a distance of half the maximum vertical coordinate value from the horizontal coordinate axis. Correspondingly, the bisector of the area between the horizontal coordinate axis and the straight line corresponding to the minimum vertical coordinate value may be a straight line that is perpendicular to the vertical coordinate axis and that is at a distance of half the minimum vertical coordinate value from the horizontal coordinate axis.

For example, when N in the rectangular constellation diagram is 2, the maximum horizontal coordinate value may be 15, the minimum horizontal coordinate value may be −15, the maximum vertical coordinate value may be 7, and the minimum vertical coordinate value is −7. The bisector of the area between the horizontal coordinate axis and the straight line corresponding to the maximum vertical coordinate value and the bisector of the area between the horizontal coordinate axis and the straight line corresponding to the minimum vertical coordinate value may be two parallel straight lines that are perpendicular to the vertical coordinate axis and that are at a distance of 7.5 from the horizontal coordinate axis.

Step 103: Horizontally move and vertically move each constellation point set in the four quadrants, to obtain a cross-shaped constellation diagram.

Specifically, the horizontally moving each constellation point set in the four quadrants may be performing movement according to a preset target horizontal coordinate, or may be separately moving each constellation point set according to a distance from their original horizontal coordinates or the vertical coordinate axis.

Optionally, the horizontally moving each constellation point set in the four quadrants in step 103 may specifically include:

respectively moving two constellation point sets in each of the four quadrants to locations that are in a first quadrant group of the four quadrants and that are at a distance of four or eight feature distances from their original horizontal coordinates, respectively moving, to a location at a distance of a first distance from the vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and moving, to the second quadrant group, two constellation point sets that are in the first quadrant group and in which a minimum vertical coordinate value of one constellation point set is greater than a maximum vertical coordinate value of the other constellation point set.

The first quadrant group includes the first quadrant and the fourth quadrant, or the second quadrant and the third quadrant. The second quadrant group includes the first quadrant and the second quadrant, or the third quadrant and the fourth quadrant. The feature distance is a distance between two adjacent constellation points in the rectangular constellation diagram. A difference between the first distance and the second distance is equal to S feature distances. A distance between constellation points with maximum horizontal coordinate values in adjacent constellation point sets in the cross-shaped constellation diagram is equal to S feature distances.

Specifically, the two constellation point sets that are in the second quadrant group and in which the minimum vertical coordinate value of the one constellation point set is greater than the maximum vertical coordinate value of the other constellation point set include: a constellation point set that is in the first quadrant and in which all vertical coordinate values are greater than vertical coordinate values of the other constellation point set, and a constellation point set that is in the second quadrant and in which all vertical coordinate values are greater than vertical coordinate values of the other constellation point set; or a constellation point set that is in the third quadrant and in which all vertical coordinate values are greater than vertical coordinate values of the other constellation point set, and a constellation point set that is in the fourth quadrant and in which all vertical coordinate values are greater than vertical coordinate values of the other constellation point set.

The two constellation point sets that are in the first quadrant group and in which the minimum vertical coordinate value of the one constellation point set is greater than the maximum vertical coordinate value of the other constellation point set include: a constellation point set that is in the first quadrant and in which all vertical coordinate values are greater than vertical coordinate values of the other constellation point set, and a constellation point set that is in the fourth quadrant and in which all vertical coordinate values are greater than vertical coordinate values of the other constellation point set; or a constellation point set that is in the second quadrant and in which all vertical coordinate values are greater than vertical coordinate values of the other constellation point set, and a constellation point set that is in the third quadrant and in which all vertical coordinate values are greater than vertical coordinate values of the other constellation point set.

It should be noted that, in the solution of this embodiment, moving a constellation point set is actually moving constellation points in the constellation point set on a basis of a constellation point set, and a relative location between the constellation points in the same constellation point set is unchanged after the movement.

The two constellation point sets in each quadrant may be moved to locations that are in the two quadrants in the first quadrant group and that are at a distance of four feature distances such as 4N from their original horizontal coordinates or that are at a distance of eight feature distances such as 8N from their original horizontal coordinates. For example, the two constellation point sets in the first quadrant may be respectively moved to a location in the second quadrant and a location in the third quadrant that are at a distance of 8N from their original horizontal coordinates, or constellation points in the two constellation point sets in the first quadrant are respectively moved to a location in the first quadrant and a location in the fourth quadrant that are at a distance of 4N from their original horizontal coordinates. The two constellation point sets in each quadrant are respectively moved to the two quadrants in the first quadrant group, so that values of high-order coded bits corresponding to a column, that is, an I component, are the same in the cross-shaped constellation diagram obtained after the movement.

The two constellation point sets that are in the two quadrants in the second quadrant group and in which the minimum vertical coordinate value of the one constellation point set is greater than the maximum vertical coordinate value of the other constellation point set are respectively moved to the location at a distance of the first distance from the vertical coordinate axis and the location at a distance of the second distance from the vertical coordinate axis that are in the same quadrant, and the difference between the first distance and the second distance is equal to S feature distances. Actually, the two constellation point sets that are in the two quadrants in the second quadrant group and in which the minimum vertical coordinate value of the one constellation point set is greater than the maximum vertical coordinate value of the other constellation point set are respectively moved to locations that are in the same quadrant and that are at different distances from the vertical coordinate axis. Because the first distance is greater than the second distance, the location at a distance of the first distance from the vertical coordinate axis is a location away from the vertical coordinate axis, and the location at a distance of the second distance from the vertical coordinate axis is a location close to the vertical coordinate axis.

Further, the two constellation point sets that are in the two quadrants in the first quadrant group and in which the minimum vertical coordinate value of the one constellation point set is greater than the maximum vertical coordinate value of the other constellation point set are respectively moved to the two quadrants in the second quadrant group, so that values of low-order coded bits corresponding to a row, that is, a Q component, are the same in the cross-shaped constellation diagram obtained after the movement.

The vertically moving each constellation point set in the four quadrants in step 103 may specifically include:

moving a constellation point with a minimum absolute value of a vertical coordinate in each constellation point set in the four quadrants to a location at a distance of one feature distance from a vertical boundary in the rectangular constellation diagram, and keeping a relative location between constellation points in each constellation point set in the four quadrants unchanged.

Specifically, for the vertical boundary in the rectangular constellation diagram, a straight line that is perpendicular to the vertical coordinate axis and that is at a distance of the maximum absolute value of the vertical coordinates in the rectangular constellation diagram from the horizontal coordinate axis is used as the boundary.

The constellation point with the minimum absolute value of the vertical coordinate in each constellation point set in the four quadrants is moved to the location at a distance of one feature distance from the vertical boundary in the rectangular constellation diagram. This can ensure that distances between adjacent constellation points in the constellation diagram obtained after the movement are equal and both are the feature distances.

In this case, horizontally moving and vertically moving each constellation point set in the four quadrants is actually separately moving the two constellation point sets in each quadrant to the locations that are in the first quadrant group and that are at a distance of four or eight feature distances from the their original horizontal coordinates, moving the constellation point with the minimum absolute value of the vertical coordinate in each constellation point set to the location at a distance of one feature distance from the vertical boundary in the rectangular constellation diagram, and keeping the relative location between constellation points in each constellation point set unchanged.

According to this embodiment of the present disclosure, S columns of constellation points, with absolute values of horizontal coordinates in a descending order, in each quadrant of a plane rectangular coordinate system may be determined as to-be-moved constellation points; to-be-moved constellation points in each of four quadrants are divided into two constellation point sets according to a bisector of an area between a horizontal coordinate axis and a straight line corresponding to a maximum absolute value of vertical coordinates; two constellation point sets in each quadrant are respectively moved to locations that are in a first quadrant group and that are at a distance of four or eight feature distances from their original horizontal coordinates; two constellation point sets that are in a second quadrant group and in which a minimum vertical coordinate value of one constellation point set is greater than a maximum vertical coordinate value of the other constellation point set are respectively moved to a location at a distance of a first distance from a vertical coordinate axis and a location at a distance of a second distance from the vertical coordinate axis that are in a quadrant; two constellation point sets that are in a first quadrant group and in which a minimum vertical coordinate of one constellation point set is greater than a maximum vertical coordinate of the other constellation point set are moved to the second quadrant group; a constellation point with a minimum absolute value of a vertical coordinate in each constellation point set is moved to a location at a distance of one feature distance from a vertical boundary in a rectangular constellation diagram, and a relative location between constellation points in each constellation point set is kept unchanged, to obtain a cross-shaped constellation diagram. Therefore, values of coded bits corresponding to one I component but different Q components or one Q component but different I components in the obtained cross-shaped constellation diagram are the same, so as to simplify LLR calculation complexity.

Embodiment 2

Figure 2:
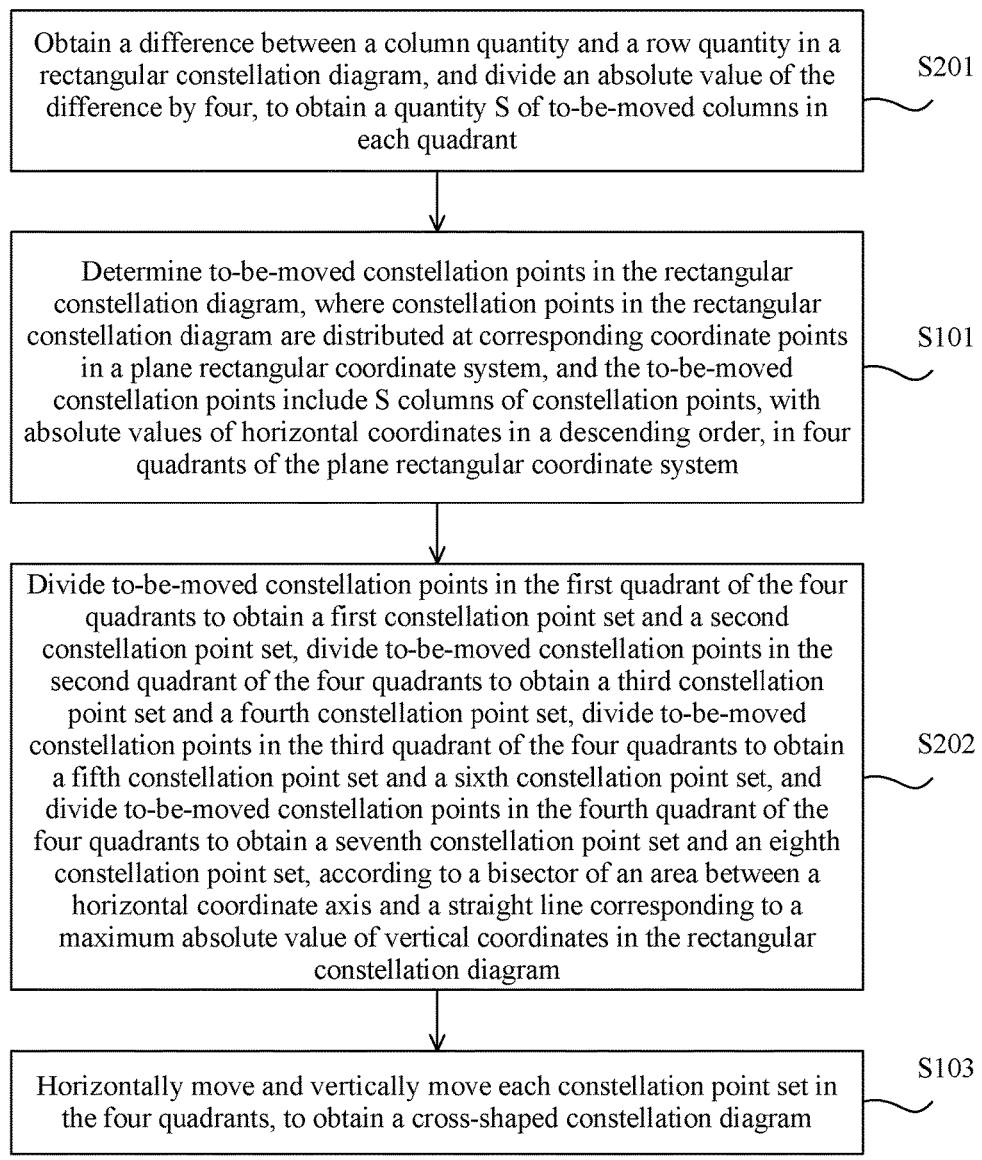
FIG. 2 is a flowchart of a digital modulation method according to Embodiment 2 of the present disclosure.

This embodiment of the present disclosure provides a digital modulation method. FIG. 2 is a flowchart of a digital modulation method according to Embodiment 2 of the present disclosure. As shown in FIG. 2, before the determining to-be-moved constellation points in a rectangular constellation diagram in step 101 in the foregoing embodiment, the solution further includes:

Step 201: Obtain a difference between a column quantity and a row quantity in the rectangular constellation diagram, and divide an absolute value of the difference by four, to obtain a quantity S of to-be-moved columns in each quadrant.

Specifically, if a data bit stream is seven bits, an I component bit stream is four bits, and a Q component bit stream is three bits, there may be $2^4$ columns in the rectangular constellation diagram, and $2^3$ rows in the rectangular constellation diagram. Therefore, the quantity S of to-be-moved columns in each quadrant may be, for example, $$\frac{2^4 - 2^3}{4}.$$

Preferably, the dividing to-be-moved constellation points in each of the four quadrants into two constellation point sets according to a bisector of an area between a horizontal coordinate axis and a straight line corresponding to a maximum absolute value of vertical coordinates in the rectangular constellation diagram in step 102 in the foregoing embodiment may specifically include:

Step 202: Divide to-be-moved constellation points in the first quadrant of the four quadrants to obtain a first constellation point set and a second constellation point set, divide to-be-moved constellation points in the second quadrant of the four quadrants to obtain a third constellation point set and a fourth constellation point set, divide to-be-moved constellation points in the third quadrant of the four quadrants to obtain a fifth constellation point set and a sixth constellation point set, and divide to-be-moved constellation points in the fourth quadrant of the four quadrants to obtain a seventh constellation point set and an eighth constellation point set, according to a bisector of an area between a horizontal coordinate axis and a straight line corresponding to the maximum absolute value of the vertical coordinates in the rectangular constellation diagram.

FIG. 3 is a schematic structural diagram of constellation point set division during digital modulation on a constellation diagram according to Embodiment 2 of the present disclosure. As shown in FIG. 3, to-be-moved constellation points in the first quadrant include a first constellation point set 301 and a second constellation point set 302, to-be-moved constellation points in the second quadrant include a third constellation point set 303 and a fourth constellation point set 304, to-be-moved constellation points in the third quadrant include a fifth constellation point set 305 and a sixth constellation point set 306, and to-be-moved constellation points in the fourth quadrant include a seventh constellation point set 307 and an eighth constellation point set 308.

On a basis of the foregoing embodiment, according to this embodiment of the present disclosure, specific constellation point set division can better ensure that constellation point sets are moved more accurately, so as to ensure that values of coded bits corresponding to one I component but different Q components or one Q component but different I components in a cross-shaped constellation diagram obtained after the movement.

Embodiment 3

This embodiment of the present disclosure further provides a digital modulation method. FIG. 4 is a flowchart of a digital modulation method according to Embodiment 3 of the present disclosure. As shown in FIG. 4, the method is based on the foregoing embodiments. Further, as described in the solution of the foregoing embodiments, the respectively moving two constellation point sets in each of the four quadrants to locations that are in a first quadrant group of the four quadrants and that are at a distance of four or eight feature distances from their original horizontal coordinates, respectively moving, to a location at a distance of a first distance from the vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and moving, to the second quadrant group, two constellation point sets that are in the first quadrant group and in which a minimum vertical coordinate value of one constellation point set is greater than a maximum vertical coordinate value of the other constellation point set may include:

Step 401: Respectively move the first constellation point set and the second constellation point set to a location in the third quadrant and a location in the second quadrant that are at a distance of eight feature distances from their original horizontal coordinates and that are at a distance of the second distance from the vertical coordinate axis, and respectively move the third constellation point set and the fourth constellation point set to a location in the third quadrant and a location in the second quadrant that are at a distance of four feature distances from their original horizontal coordinates and that are at a distance of the first distance from the vertical coordinate axis.

Step 402: Respectively move the fifth constellation point set and the sixth constellation point set to a location in the fourth quadrant and a location in the first quadrant that are at a distance of eight feature distances from their original horizontal coordinates and that are at a distance of the second distance from the vertical coordinate axis, and respectively move the seventh constellation point set and the eighth constellation point set to a location in the fourth quadrant and a location in the first quadrant that are at a distance of four feature distances from their original horizontal coordinates and that are at a distance of the first distance from the vertical coordinate axis.

Figure 5:
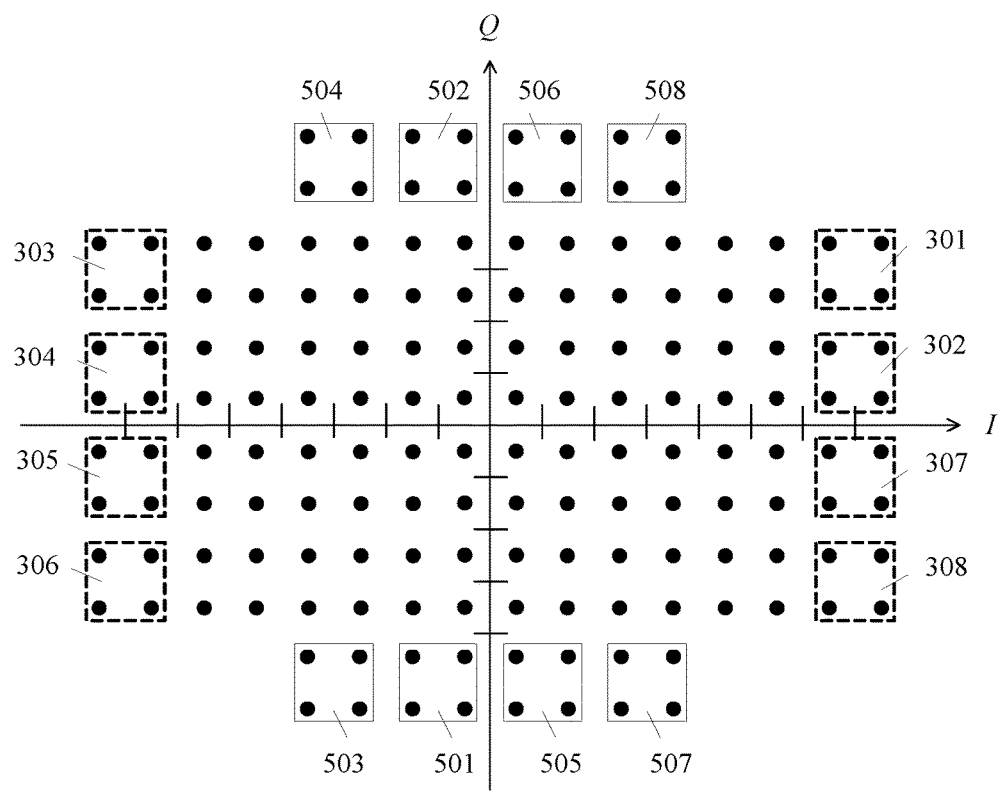
FIG. 5 is a schematic structural diagram of a cross-shaped constellation diagram obtained by using the digital modulation method according to Embodiment 3 of the present disclosure.

FIG. 5 is a schematic structural diagram of a cross-shaped constellation diagram obtained by using the digital modulation method according to Embodiment 3 of the present disclosure. According to step 401, the first constellation point set 301 is moved to a location of a first constellation point set 501 shown in FIG. 5, the second constellation point set 302 is moved to a location of a second constellation point set 502 shown in FIG. 5, the third constellation point set 303 is moved to a location of a third constellation point set 503 shown in FIG. 5, and the fourth constellation point set 304 is moved to a location of a fourth constellation point set 504 shown in FIG. 5. According to step 402, the fifth constellation point set 305 may be moved to a location of a fifth constellation point set 505 shown in FIG. 5, the sixth constellation point set 306 may be moved to a location of a sixth constellation point set 506 shown in FIG. 5, the seventh constellation point set 307 may be moved to a location of a seventh constellation point set 507 shown in FIG. 5, and the eighth constellation point set 308 may be moved to a location of an eighth constellation point set 508 shown in FIG. 5.

In this embodiment, the foregoing digital modulation method is further described by means of another type of constellation point set movement. Beneficial effects of this embodiment are similar to those of the foregoing embodiments, and details are not described herein again.

Embodiment 4

Figure 6:
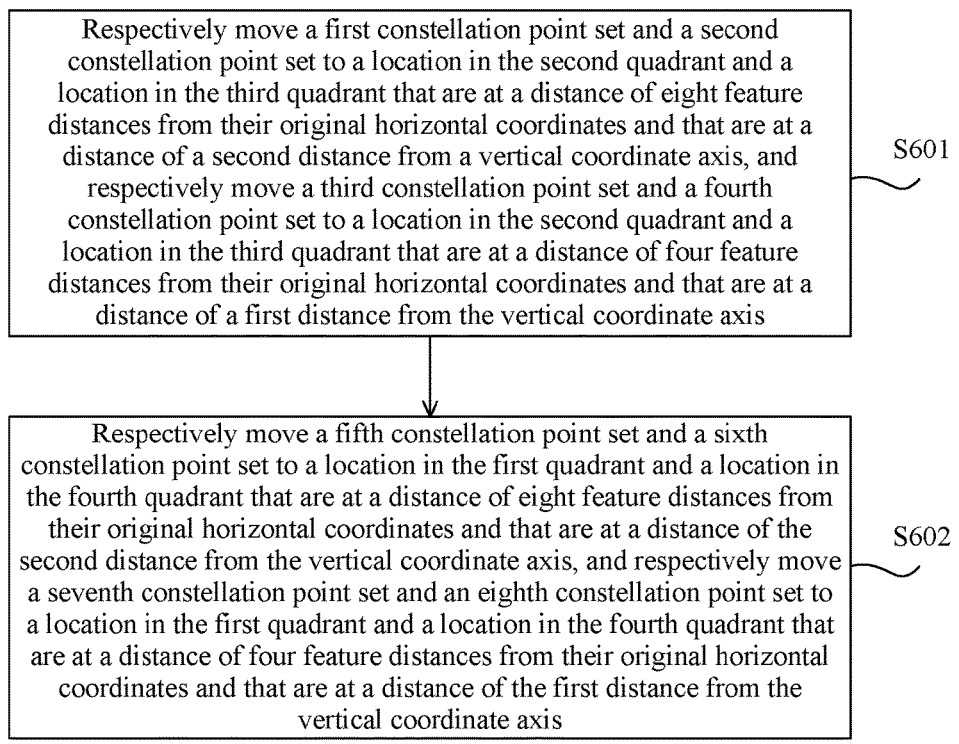
FIG. 6 is a flowchart of a digital modulation method according to Embodiment 4 of the present disclosure.

This embodiment of the present disclosure further provides a digital modulation method. FIG. 6 is a flowchart of a digital modulation method according to Embodiment 4 of the present disclosure. As shown in FIG. 6, the method is based on the foregoing embodiments. As described in the foregoing embodiments, the respectively moving two constellation point sets in each of the four quadrants to locations that are in a first quadrant group of the four quadrants and that are at a distance of four or eight feature distances from their original horizontal coordinates, respectively moving, to a location at a distance of a first distance from the vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and moving, to the second quadrant group, two constellation point sets that are in the first quadrant group and in which a minimum vertical coordinate value of one constellation point set is greater than a maximum vertical coordinate value of the other constellation point set may include:

Step 601: Respectively move the first constellation point set and the second constellation point set to a location in the second quadrant and a location in the third quadrant that are at a distance of eight feature distances from their original horizontal coordinates and that are at a distance of the second distance from the vertical coordinate axis, and respectively move the third constellation point set and the fourth constellation point set to a location in the second quadrant and a location in the third quadrant that are at a distance of four feature distances from their original horizontal coordinates and that are at a distance of the first distance from the vertical coordinate axis.

Step 602: Respectively move the fifth constellation point set and the sixth constellation point set to a location in the first quadrant and a location in the fourth quadrant that are at a distance of eight feature distances from their original horizontal coordinates and that are at a distance of the second distance from the vertical coordinate axis, and respectively move the seventh constellation point set and the eighth constellation point set to a location in the first quadrant and a location in the fourth quadrant that are at a distance of four feature distances from their original horizontal coordinates and that are at a distance of the first distance from the vertical coordinate axis.

Figure 7:
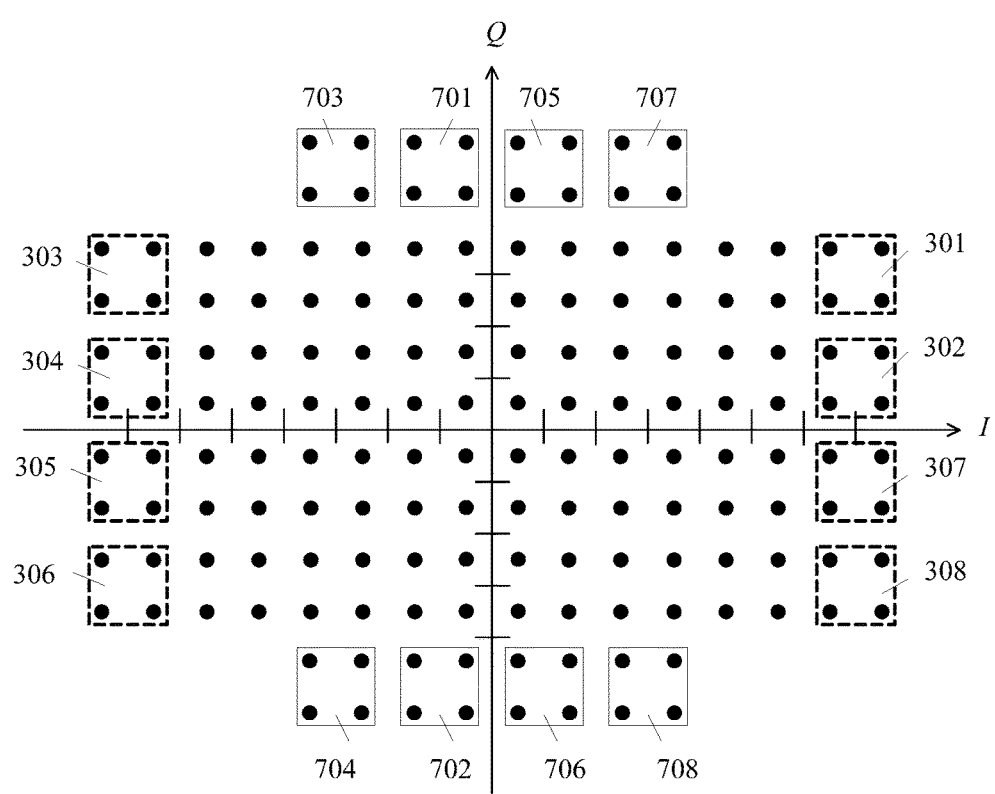
FIG. 7 is a schematic structural diagram of a cross-shaped constellation diagram obtained by using the digital modulation method according to Embodiment 4 of the present disclosure.

FIG. 7 is a schematic structural diagram of a cross-shaped constellation diagram obtained by using the digital modulation method according to Embodiment 4 of the present disclosure. According to step 601, the first constellation point set 301 is moved to a location of a first constellation point set 701 shown in FIG. 7, the second constellation point set 302 is moved to a location of a second constellation point set 702 shown in FIG. 7, the third constellation point set 303 is moved to a location of a third constellation point set 703 shown in FIG. 7, and the fourth constellation point set 304 is moved to a location of a fourth constellation point set 704 shown in FIG. 7. According to step 602, the fifth constellation point set 305 may be moved to a location of a fifth constellation point set 705 shown in FIG. 7, the sixth constellation point set 306 may be moved to a location of a sixth constellation point set 706 shown in FIG. 7, the seventh constellation point set 307 may be moved to a location of a seventh constellation point set 707 shown in FIG. 7, and the eighth constellation point set 308 may be moved to a location of an eighth constellation point set 708 shown in FIG. 7.

In this embodiment, the foregoing digital modulation method is further described by means of another type of constellation point set movement. Beneficial effects of this embodiment are similar to those of the foregoing embodiments, and details are not described herein again.

Embodiment 5

Figure 8:
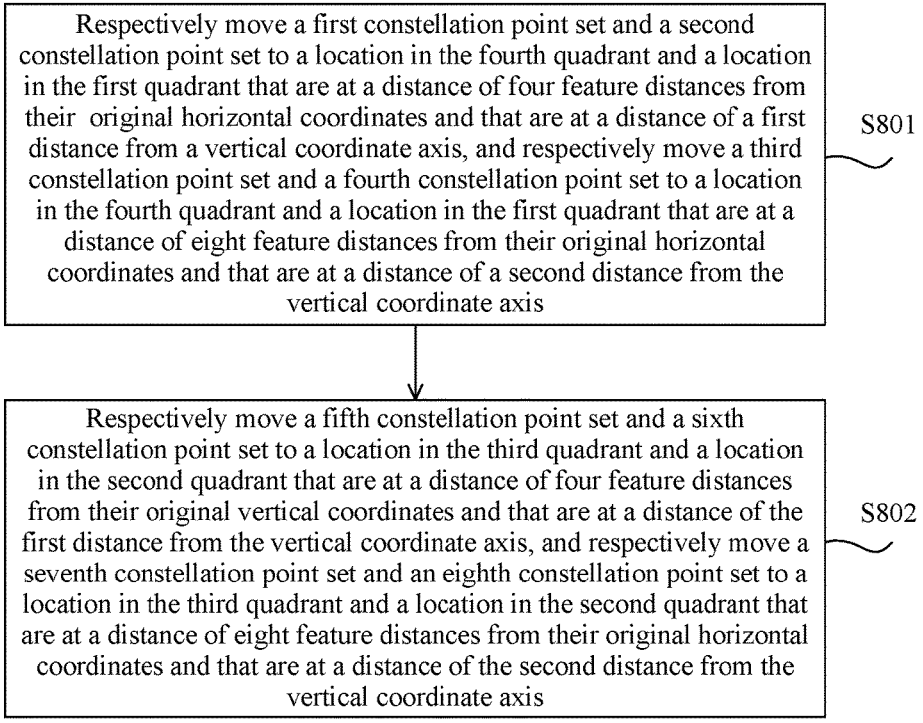
FIG. 8 is a flowchart of a digital modulation method according to Embodiment 5 of the present disclosure.

This embodiment of the present disclosure further provides a digital modulation method. FIG. 8 is a flowchart of a digital modulation method according to Embodiment 5 of the present disclosure. As shown in FIG. 8, the method is based on the foregoing embodiments. As described in the solution of the foregoing embodiments, the respectively moving two constellation point sets in each of the four quadrants to locations that are in a first quadrant group of the four quadrants and that are at a distance of four or eight feature distances from their original horizontal coordinates, respectively moving, to a location at a distance of a first distance from the vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and moving, to the second quadrant group, two constellation point sets that are in the first quadrant group and in which a minimum vertical coordinate value of one constellation point set is greater than a maximum vertical coordinate value of the other constellation point set may include:

Step 801: Respectively move the first constellation point set and the second constellation point set to a location in the fourth quadrant and a location in the first quadrant that are at a distance of four feature distances from their original horizontal coordinates and that are at a distance of the first distance from the vertical coordinate axis, and respectively move the third constellation point set and the fourth constellation point set to a location in the fourth quadrant and a location in the first quadrant that are at a distance of eight feature distances from their original horizontal coordinates and that are at a distance of the second distance from the vertical coordinate axis.

Step 802: Respectively move the fifth constellation point set and the sixth constellation point set to a location in the third quadrant and a location in the second quadrant that are at a distance of four feature distances from their original horizontal coordinates and that are at a distance of the first distance from the vertical coordinate axis, and respectively move the seventh constellation point set and the eighth constellation point set to a location in the third quadrant and a location in the second quadrant that are at a distance of eight feature distances from their original horizontal coordinates and that are at a distance of the second distance from the vertical coordinate axis.

Figure 9:
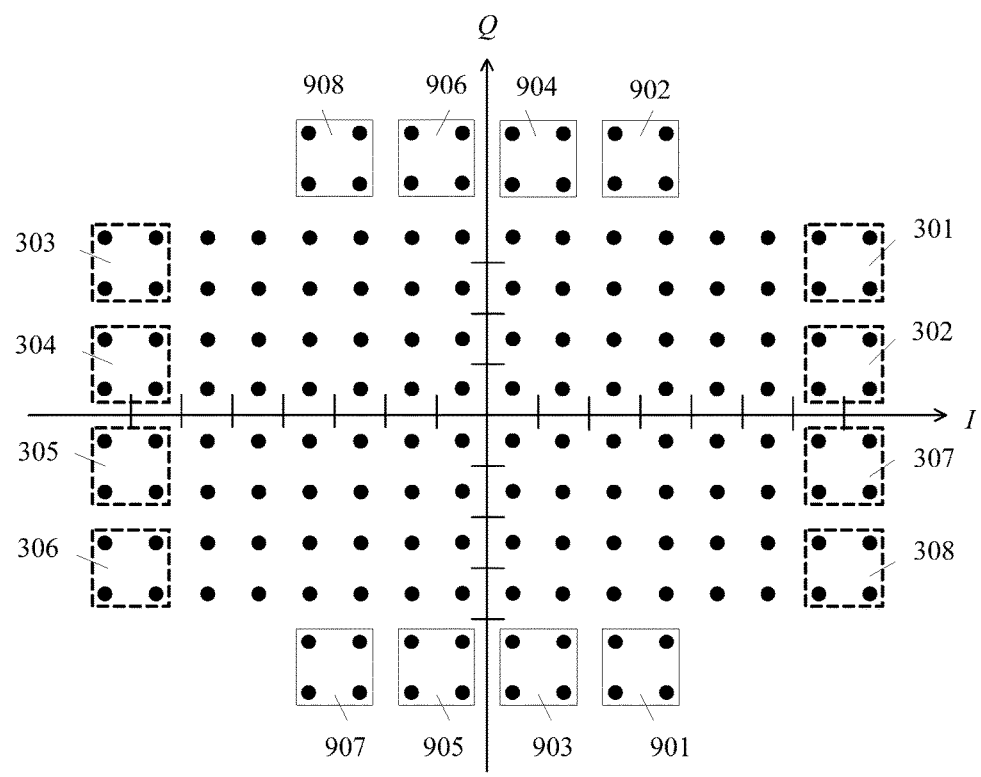
FIG. 9 is a schematic structural diagram of a cross-shaped constellation diagram obtained by using the digital modulation method according to Embodiment 5 of the present disclosure.

FIG. 9 is a schematic structural diagram of a cross-shaped constellation diagram obtained by using the digital modulation method according to Embodiment 5 of the present disclosure. According to step 801, the first constellation point set 301 is moved to a location of a first constellation point set 901 shown in FIG. 9, the second constellation point set 302 is moved to a location of a second constellation point set 902 shown in FIG. 9, the third constellation point set 303 is moved to a location of a third constellation point set 903 shown in FIG. 9, and the fourth constellation point set 304 is moved to a location of a fourth constellation point set 904 shown in FIG. 9. According to step 802, the fifth constellation point set 305 may be moved to a location of a fifth constellation point set 905 shown in FIG. 9, the sixth constellation point set 306 may be moved to a location of a sixth constellation point set 906 shown in FIG. 9, the seventh constellation point set 307 may be moved to a location of a seventh constellation point set 907 shown in FIG. 9, and the eighth constellation point set 308 may be moved to a location of an eighth constellation point set 908 shown in FIG. 9.

In this embodiment, the foregoing digital modulation method is further described by means of another type of constellation point set movement. Beneficial effects of this embodiment are similar to those of the foregoing embodiments, and details are not described herein again.

Embodiment 6

This embodiment of the present disclosure further provides a digital modulation method. FIG. 10 is a flowchart of a digital modulation method according to Embodiment 6 of the present disclosure. As shown in FIG. 10, the method is based on the foregoing embodiments. As described in the solution of the forgoing embodiments, the respectively moving two constellation point sets in each of the four quadrants to locations that are in a first quadrant group of the four quadrants and that are at a distance of four or eight feature distances from their original horizontal coordinates, respectively moving, to a location at a distance of a first distance from the vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and moving, to the second quadrant group, two constellation point sets that are in the first quadrant group and in which a minimum vertical coordinate value of one constellation point set is greater than a maximum vertical coordinate value of the other constellation point set may include:

Step 1001: Respectively move the first constellation point set and the second constellation point set to a location in the first quadrant and a location in the fourth quadrant that are at a distance of four feature distances from their original horizontal coordinates and that are at a distance of the first distance from the vertical coordinate axis, and respectively move the third constellation point set and the fourth constellation point set to a location in the first quadrant and a location in the fourth quadrant that are at a distance of eight feature distances from their original horizontal coordinates and that are at a distance of the second distance from the vertical coordinate axis.

Step 1002: Respectively move the fifth constellation point set and the sixth constellation point set to a location in the second quadrant and a location in the third quadrant that are at a distance of four feature distances from their original horizontal coordinates and that are at a distance of the first distance from the vertical coordinate axis, and respectively move the seventh constellation point set and the eighth constellation point set to a location in the second quadrant and a location in the third quadrant that are at a distance of eight feature distances from their original horizontal coordinates and that are at a distance of the second distance from the vertical coordinate axis.

Figure 11:
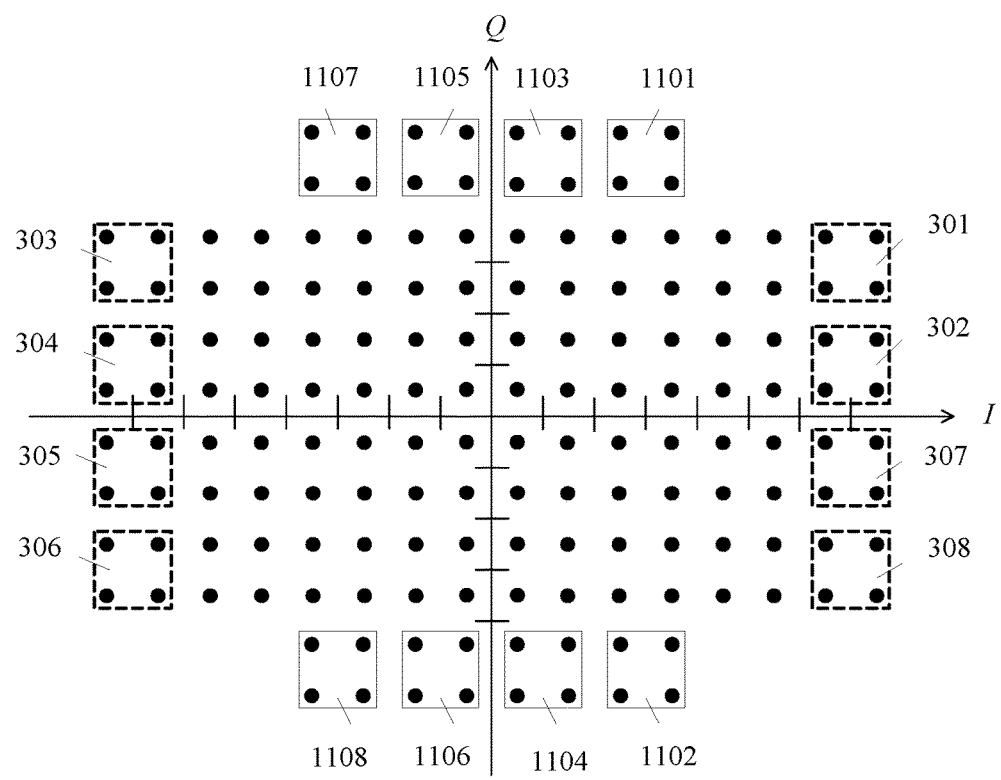
FIG. 11 is a schematic structural diagram of a cross-shaped constellation diagram obtained by using a digital modulation method according to Embodiment 6 of the present disclosure.

FIG. 11 is a schematic structural diagram of a cross-shaped constellation diagram obtained by using the digital modulation method according to Embodiment 6 of the present disclosure. According to step 1001, the first constellation point set 301 is moved to a location of a first constellation point set 1101 shown in FIG. 11, the second constellation point set 302 is moved to a location of a second constellation point set 1102 shown in FIG. 11, the third constellation point set 303 is moved to a location of a third constellation point set 1103 shown in FIG. 11, and the fourth constellation point set 304 is moved to a location of a fourth constellation point set 1104 shown in FIG. 11. According to step 1002, the fifth constellation point set 305 may be moved to a location of a fifth constellation point set 1105 shown in FIG. 11, the sixth constellation point set 306 may be moved to a location of a sixth constellation point set 1106 shown in FIG. 11, the seventh constellation point set 307 may be moved to a location of a seventh constellation point set 1107 shown in FIG. 11, and the eighth constellation point set 308 may be moved to a location of an eighth constellation point set 1108 shown in FIG. 11.

In this embodiment, the foregoing digital modulation method is described by means of another type of constellation point set movement. Beneficial effects of this embodiment are similar to those of the foregoing embodiments, and details are not described herein again.

It should be noted that Embodiment 3, Embodiment 4, Embodiment 5, and Embodiment 6 are respectively four different implementation manners for describing the solution of the foregoing embodiments, and the four different implementation manners are independent of each other. The constellation point sets may be moved according to a quadrant sequence, or moved simultaneously, and this embodiment is not limited thereto.

Embodiment 7

Figure 12A:
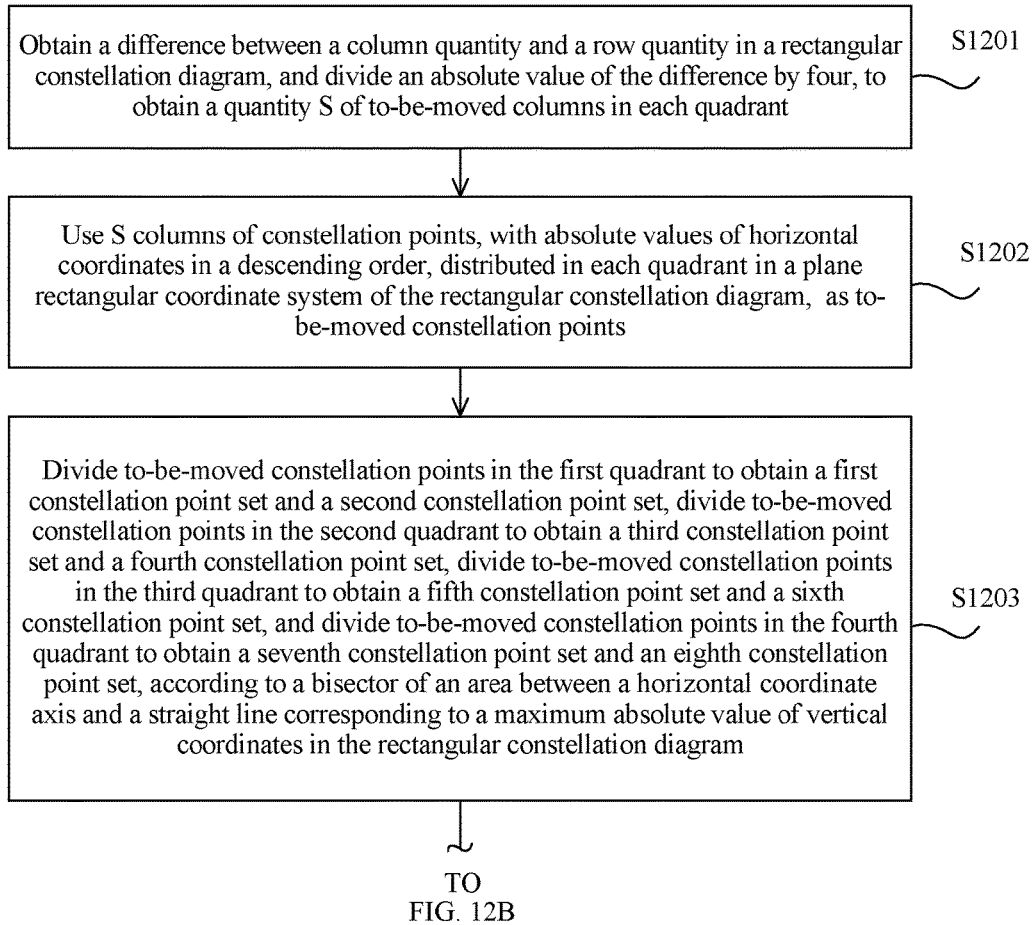

This embodiment of the present disclosure further provides a digital modulation method. In this embodiment, the foregoing embodiments are specifically described by using an instance. FIG. 12A and FIG. 12B are a flowchart of a digital modulation method according to Embodiment 7 of the present disclosure. As shown in FIG. 12A and FIG. 12B, the method includes the following steps.

Step 1201: Obtain a difference between a column quantity and a row quantity in a rectangular constellation diagram, and divide an absolute value of the difference by four, to obtain a quantity S of to-be-moved columns in each quadrant.

Specifically, if the rectangular constellation diagram is a 128QAM constellation diagram, the row quantity in the rectangular constellation diagram is $2^3$, and the column quantity is $2^4$. Therefore, the quantity S of to-be-moved columns in each quadrant may be $$\frac{2^4 - 2^3}{4}.$$

That is, S is equal to 2.

Step 1202: Use S columns of constellation points, with absolute values of horizontal coordinates in a descending order, distributed in each quadrant of a plane rectangular coordinate system of the rectangular constellation diagram, as to-be-moved constellation points.

Step 1203: Divide to-be-moved constellation points in the first quadrant to obtain a first constellation point set and a second constellation point set, divide to-be-moved constellation points in the second quadrant to obtain a third constellation point set and a fourth constellation point set, divide to-be-moved constellation points in the third quadrant to obtain a fifth constellation point set and a sixth constellation point set, and divide to-be-moved constellation points in the fourth quadrant to obtain a seventh constellation point set and an eighth constellation point set, according to a bisector of an area between a horizontal coordinate axis and a straight line corresponding to a maximum absolute value of vertical coordinates in the rectangular constellation diagram.

Step 1204: Respectively move the first constellation point set and the second constellation point set to a location in the third quadrant and a location in the second quadrant that are at a distance of eight feature distances from their original horizontal coordinates and that are at a distance of a second distance from a vertical coordinate axis, and respectively move the third constellation point set and the fourth constellation point set to a location in the third quadrant and a location in the second quadrant that are at a distance of four feature distances from their original horizontal coordinates and that are at a distance of a first distance from the vertical coordinate axis.

Step 1205: Respectively move the fifth constellation point set and the sixth constellation point set to a location in the fourth quadrant and a location in the first quadrant that are at a distance of eight feature distances from their original horizontal coordinates and that are at a distance of the second distance from the vertical coordinate axis, and respectively move the seventh constellation point set and the eighth constellation point set to a location in the fourth quadrant and a location in the first quadrant that are at a distance of four feature distances from their original horizontal coordinates and that are at a distance of the first distance from the vertical coordinate axis.

Step 1206: Move a constellation point with a minimum absolute value of a vertical coordinate in each constellation point set in the four quadrants to a location at a distance of one feature distance from a vertical boundary in the rectangular constellation diagram, and keep a relative location between constellation points in each constellation point set in the four quadrants unchanged, to obtain a cross-shaped constellation diagram.

Step 1204, step 1205, and step 1206 may be executed simultaneously or executed one after another. This is not limited in this embodiment.

It should be noted that, in the foregoing embodiment, moving a constellation point set is actually moving constellation points in the constellation point set as a whole, and a relative location between the constellation points inside the constellation point set is kept unchanged.

In step 1204 and step 1205, moving the constellation point sets in each quadrant may be performing movement according to original coordinates and target coordinates of constellation points in each constellation point set. For example, (I, Q) may be used to represent original coordinates of a constellation point, and (I', Q') may be used to represent target coordinates of the constellation point. Moving constellation points in a constellation point set in the foregoing may be performed by executing the following program instructions:

if(|I|>((MI+MQ)/2−1)) then
  if(I>0) then //Determine the first quadrant and the fourth quadrant;

if(Q>2S) then //Determine a constellation point in the first constellation point set in the first quadrant;
   I'=I−8S; //Determine a target coordinate I of the constellation point in the first constellation point set;
   Q'=Q−8S. //Determine a target coordinate Q of the constellation point in the first constellation point set;
   else if(Q>0)&&(Q<2S) then //Determine a constellation point in the second constellation point set in the first quadrant;
   I'=I−8S; //Determine a target coordinate I of the constellation point in the second constellation point set;
   Q'=Q+4S. //Determine a target coordinate Q of the constellation point in the second constellation point set;
   else if(Q<0)&&(Q>−2S) then. //Determine a constellation point of the seventh constellation point set in the fourth quadrant;
   I'=I−4S; //Determine a target coordinate I of the constellation point in the seventh constellation point set;
   Q'=Q−4S. //Determine a target coordinate Q of the constellation point in the seventh constellation point set;
   else if (Q<−2S) then //Determine a constellation point in the eighth constellation point set in the fourth quadrant;
   I'=I−4S; //Determine a target coordinate I of the constellation point in the eighth constellation point set;
   Q'=Q+8S. //Determine a target coordinate Q of the constellation point in the eighth constellation point set;
Else //Determine the second quadrant and the third quadrant;
if (Q>2S) then //Determine a constellation point in the third constellation point set in the second quadrant;
   I'=I+4S; //Determine a target coordinate I of the constellation point in the third constellation point set;
   Q'=Q−8S. //Determine a target coordinate Q of the constellation point in the third constellation point set;
   else if(Q>0)&&(Q<2S) then //Determine a constellation point in the fourth constellation point set in the second quadrant;
   I'=I+4S; //Determine a target coordinate I of the constellation point in the fourth constellation point set;
   Q'=Q+4S. //Determine a target coordinate Q of the constellation point in the fourth constellation point set;
   else if(Q<0)&&(Q>−2S) then //Determine a constellation point in the fifth constellation point set in the third quadrant;
   I'=I+8 S; //Determine a target coordinate I of the constellation point in the fifth constellation point set;
   Q'=Q−4S. //Determine a target coordinate Q of the constellation point in the fifth constellation point set;
   else if(Q<−2S) then //Determine a constellation point in the sixth constellation point set in the third quadrant;
   I'=I+8S; //Determine a target coordinate I of the constellation point in the sixth constellation point set;
   Q'=Q+8S. //Determine a target coordinate Q of the constellation point in the sixth constellation point set;
   end if
end Constellation points in $MI=2^4=16$ columns and $MQ=2^3=8$ rows need to be shaped, and S=2 columns.

In this embodiment, the foregoing embodiments are further described by using a specific instance. Beneficial effects of this embodiment are similar to those of the foregoing embodiments, and details are not described herein again.

Embodiment 8

Figure 13:
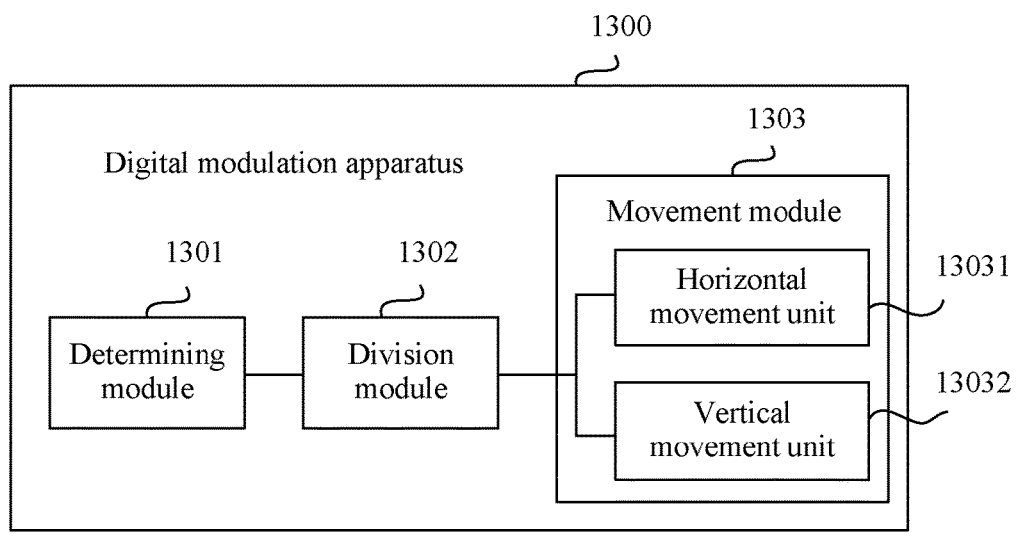
FIG. 13 is a schematic structural diagram of a digital modulation apparatus according to Embodiment 8 of the present disclosure.

This embodiment 8 further provides a digital modulation apparatus. The digital modulation apparatus may be integrated in a soft information calculation module at a receive end in a hardware and/or software manner, and may be integrated in a constellation mapping module at a transmit end in a hardware and/or software manner. FIG. 13 is a schematic structural diagram of a digital modulation apparatus according to Embodiment 8 of the present disclosure.

As shown in FIG. 13, the digital modulation apparatus 1300 includes:

a determining module 1301, configured to determine to-be-moved constellation points in a rectangular constellation diagram, where constellation points in the rectangular constellation diagram are distributed at corresponding coordinate points in a plane rectangular coordinate system, the to-be-moved constellation points include S columns of constellation points, with absolute values of horizontal coordinates in a descending order, in four quadrants of the plane rectangular coordinate system, and the rectangular constellation diagram is a constellation diagram generated by performing quadrature amplitude modulation QAM on a data bit stream, where S is a quantity of to-be-moved columns in each quadrant;

a division module 1302, configured to divide to-be-moved constellation points in each of the four quadrants into two constellation point sets according to a bisector of an area between a horizontal coordinate axis and a straight line corresponding to a maximum absolute value of vertical coordinates in the rectangular constellation diagram; and a movement module 1303, configured to horizontally move and vertically move each constellation point set in the four quadrants, to obtain a cross-shaped constellation diagram.

The movement module 1303 includes:

a horizontal movement unit 13031, configured to: respectively move two constellation point sets in each of the four quadrants to locations that are in a first quadrant group of the four quadrants and that are at a distance of four or eight feature distances from their original horizontal coordinates, respectively move, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and move, to the second quadrant group, two constellation point sets that are in the first quadrant group and in which a minimum vertical coordinate value of one constellation point set is greater than a maximum vertical coordinate value of the other constellation point set, where the first quadrant group includes the first quadrant and the fourth quadrant, or the second quadrant and the third quadrant, the second quadrant group includes the first quadrant and the second quadrant, or the third quadrant and the fourth quadrant, the feature distance is a distance between two adjacent constellation points in the rectangular constellation diagram, a difference between the first distance and the second distance is equal to S feature distances, and a distance between constellation points with maximum horizontal coordinate values in adjacent constellation point sets in the cross-shaped constellation diagram is equal to S feature distances; and a vertical movement unit 13032, configured to: move a constellation point with a minimum absolute value of a vertical coordinate in each constellation point set in the four quadrants to a location at a distance of one feature distance from a vertical boundary in the rectangular constellation diagram, and keep a relative location between constellation points in each constellation point set in the four quadrants unchanged.

The digital modulation apparatus provided in this embodiment may implement any one of the foregoing described digital modulation methods. A specific implementation process and beneficial effects of this embodiment are similar to those of the foregoing embodiments, and details are not described herein again.

Further, the digital modulation apparatus 1300 further includes:

an obtaining module, configured to: before the determining module 1301 determines the to-be-moved constellation points in the rectangular constellation diagram, obtain a difference between a column quantity and a row quantity in the rectangular constellation diagram, and divide an absolute value of the difference by four, to obtain the quantity of to-be-moved columns in each quadrant.

In the solution of the foregoing embodiment, the division module 1302 is specifically configured to: divide to-be-moved constellation points in the first quadrant of the four quadrants to obtain a first constellation point set and a second constellation point set, divide to-be-moved constellation points in the second quadrant of the four quadrants to obtain a third constellation point set and a fourth constellation point set, divide to-be-moved constellation points in the third quadrant of the four quadrants to obtain a fifth constellation point set and a sixth constellation point set, and divide to-be-moved constellation points in the fourth quadrant of the four quadrants to obtain a seventh constellation point set and an eighth constellation point set, according to the bisector of the area between the horizontal coordinate axis and the straight line corresponding to the maximum absolute value of the vertical coordinates in the rectangular constellation diagram.

Optionally, the horizontal movement unit 13031 is further configured to: respectively move the first constellation point set and the second constellation point set to a location in the third quadrant and a location in the second quadrant that are at a distance of eight feature distances from their original horizontal coordinates and that are at a distance of the second distance from the vertical coordinate axis, respectively move the third constellation point set and the fourth constellation point set to a location in the third quadrant and a location in the second quadrant that are at a distance of four feature distances from their original horizontal coordinates and that are at a distance of the first distance from the vertical coordinate axis, respectively move the fifth constellation point set and the sixth constellation point set to a location in the fourth quadrant and a location in the first quadrant that are at a distance of eight feature distances from their original horizontal coordinates and that are at a distance of the second distance from the vertical coordinate axis, and respectively move the seventh constellation point set and the eighth constellation point set to a location in the fourth quadrant and a location in the first quadrant that are at a distance of four feature distances from their original horizontal coordinates and that are at a distance of the first distance from the vertical coordinate axis.

Alternatively, the horizontal movement unit 13031 is further configured to: respectively move the first constellation point set and the second constellation point set to a location in the second quadrant and a location in the third quadrant that are at a distance of eight feature distances from their original horizontal coordinates and that are at a distance of the second distance from the vertical coordinate axis, respectively move the third constellation point set and the fourth constellation point set to a location in the second quadrant and a location in the third quadrant that are at a distance of four feature distances from their original horizontal coordinates and that are at a distance of the first distance from the vertical coordinate axis, respectively move the fifth constellation point set and the sixth constellation point set to a location in the first quadrant and a location in the fourth quadrant that are at a distance of eight feature distances from their original horizontal coordinates and that are at a distance of the second distance from the vertical coordinate axis, and respectively move the seventh constellation point set and the eighth constellation point set to a location in the first quadrant and a location in the fourth quadrant that are at a distance of four feature distances from their original horizontal coordinates and that are at a distance of the first distance from the vertical coordinate axis.

Alternatively, the horizontal movement unit 13031 is further configured to: respectively move the first constellation point set and the second constellation point set to a location in the fourth quadrant and a location in the first quadrant that are at a distance of four feature distances from their original horizontal coordinates and that are at a distance of the first distance from the vertical coordinate axis, respectively move the third constellation point set and the fourth constellation point set to a location in the fourth quadrant and a location in the first quadrant that are at a distance of eight feature distances from their original horizontal coordinates and that are at a distance of the second distance from the vertical coordinate axis, respectively move the fifth constellation point set and the sixth constellation point set to a location in the third quadrant and a location in the second quadrant that are at a distance of four feature distances from their original horizontal coordinates and that are at a distance of the first distance from the vertical coordinate axis, and respectively move the seventh constellation point set and the eighth constellation point set to a location in the third quadrant and a location in the second quadrant that are at a distance of eight feature distances from their original horizontal coordinates and that are at a distance of the second distance from the vertical coordinate axis.

Alternatively, the horizontal movement unit 13031 is further configured to: respectively move the first constellation point set and the second constellation point set to a location in the first quadrant and a location in the fourth quadrant that are at a distance of four feature distances from their original horizontal coordinates and that are at a distance of the first distance from the vertical coordinate axis, respectively move the third constellation point set and the fourth constellation point set to a location in the first quadrant and a location in the fourth quadrant that are at a distance of eight feature distances from their original horizontal coordinates and that are at a distance of the second distance from the vertical coordinate axis, respectively move the fifth constellation point set and the sixth constellation point set to a location in the second quadrant and a location in the third quadrant that are at a distance of four feature distances from their original horizontal coordinates and that are at a distance of the first distance from the vertical coordinate axis, and respectively move the seventh constellation point set and the eighth constellation point set to a location in the second quadrant and a location in the third quadrant that are at a distance of eight feature distances from their original horizontal coordinates and that are at a distance of the second distance from the vertical coordinate axis.

The digital modulation apparatus provided in this embodiment may implement any one of the foregoing described digital modulation methods. A specific implementation process and beneficial effects of this embodiment are similar to those of the foregoing embodiments, and details are not described herein again.

Embodiment 9

Figure 14:
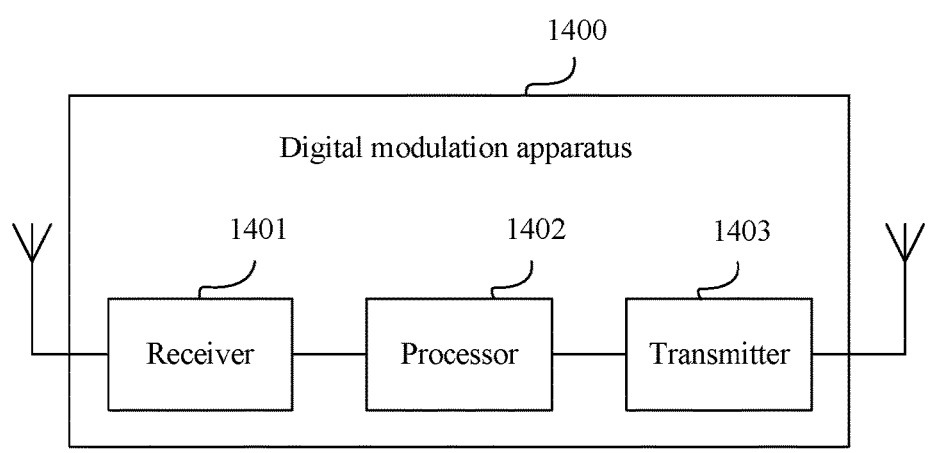
FIG. 14 is a schematic structural diagram of a digital modulation apparatus according to Embodiment 9 of the present disclosure.

Embodiment 9 further provides a digital modulation apparatus. The digital modulation apparatus may be integrated in a soft information calculation module at a receive end in a hardware and/or software manner, and may be integrated in a constellation mapping module at a transmit end in a hardware and/or software manner. FIG. 14 is a schematic structural diagram of a digital modulation apparatus according to Embodiment 9 of the present disclosure.

As shown in FIG. 14, the digital modulation apparatus 1400 includes a receiver 1401, a processor 1402, and a transmitter 1403.

The processor 1402 is configured to: determine to-be-moved constellation points in a rectangular constellation diagram, divide to-be-moved constellation points in each of the four quadrants into two constellation point sets according to a bisector of an area between a horizontal coordinate axis and a straight line corresponding to a maximum absolute value of vertical coordinates in the rectangular constellation diagram, and horizontally move and vertically move each constellation point set in the four quadrants, to obtain a cross-shaped constellation diagram.

Constellation points in the rectangular constellation diagram are distributed at corresponding coordinate points in a plane rectangular coordinate system. The to-be-moved constellation points include S columns of constellation points, with absolute values of horizontal coordinates in a descending order, in the four quadrants of the plane rectangular coordinate system. The rectangular constellation diagram is a constellation diagram generated by performing quadrature amplitude modulation QAM on a data bit stream, and S is a quantity of to-be-moved columns in each quadrant.

The processor 1402 is specifically configured to: respectively move two constellation point sets in each of the four quadrants to locations that are in a first quadrant group of the four quadrants and that are at a distance of four or eight feature distances from original horizontal coordinates, respectively move, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and move, to the second quadrant group, two constellation point sets that are in the first quadrant group and in which a minimum vertical coordinate value of one constellation point set is greater than a maximum vertical coordinate value of the other constellation point set.

The first quadrant group includes the first quadrant and the fourth quadrant, or the second quadrant and the third quadrant. The second quadrant group includes the first quadrant and the second quadrant, or the third quadrant and the fourth quadrant. The feature distance is a distance between two adjacent constellation points in the rectangular constellation diagram. A difference between the first distance and the second distance is equal to S feature distances. A distance between constellation points with maximum horizontal coordinate values in adjacent constellation point sets in the cross-shaped constellation diagram is equal to S feature distances.

The processor 1402 is further configured to: move a constellation point with a minimum absolute value of a vertical coordinate in each constellation point set in the four quadrants to a location at a distance of one feature distance from a vertical boundary in the rectangular constellation diagram, and keep a relative location between constellation points in each constellation point set in the four quadrants unchanged.

The digital modulation apparatus provided in this embodiment may implement any one of the foregoing described digital modulation methods. A specific implementation process and beneficial effects of this embodiment are similar to those of the foregoing embodiments, and details are not described herein again.

Further, the processor 1402 is further configured to: before determining the to-be-moved constellation points in the rectangular constellation diagram, obtain a difference between a column quantity and a row quantity in the rectangular constellation diagram, and divide an absolute value of the difference by four, to obtain the quantity of to-be-moved columns in each quadrant.

In the solution of the foregoing embodiment, the processor 1402 is further configured to: divide to-be-moved constellation points in the first quadrant of the four quadrants to obtain a first constellation point set and a second constellation point set, divide to-be-moved constellation points in the second quadrant of the four quadrants to obtain a third constellation point set and a fourth constellation point set, divide to-be-moved constellation points in the third quadrant of the four quadrants to obtain a fifth constellation point set and a sixth constellation point set, and divide to-be-moved constellation points in the fourth quadrant of the four quadrants to obtain a seventh constellation point set and an eighth constellation point set, according to the bisector of the area between the horizontal coordinate axis and the straight line corresponding to the maximum absolute value of the vertical coordinates in the rectangular constellation diagram.

Optionally, the processor 1402 is further configured to: respectively move the first constellation point set and the second constellation point set to a location in the third quadrant and a location in the second quadrant that are at a distance of eight feature distances from their original horizontal coordinates and that are at a distance of the second distance from the vertical coordinate axis, respectively move the third constellation point set and the fourth constellation point set to a location in the third quadrant and a location in the second quadrant that are at a distance of four feature distances from their original horizontal coordinates and that are at a distance of the first distance from the vertical coordinate axis, respectively move the fifth constellation point set and the sixth constellation point set to a location in the fourth quadrant and a location in the first quadrant that are at a distance of eight feature distances from their original horizontal coordinates and that are at a distance of the second distance from the vertical coordinate axis, and respectively move the seventh constellation point set and the eighth constellation point set to a location in the fourth quadrant and a location in the first quadrant that are at a distance of four feature distances from their original horizontal coordinates and that are at a distance of the first distance from the vertical coordinate axis.

Alternatively, the processor 1402 is further configured to: respectively move the first constellation point set and the second constellation point set to a location in the second quadrant and a location in the third quadrant that are at a distance of eight feature distances from their original horizontal coordinates and that are at a distance of the second distance from the vertical coordinate axis, respectively move the third constellation point set and the fourth constellation point set to a location in the second quadrant and a location in the third quadrant that are at a distance of four feature distances from their original horizontal coordinates and that are at a distance of the first distance from the vertical coordinate axis, respectively move the fifth constellation point set and the sixth constellation point set to a location in the first quadrant and a location in the fourth quadrant that are at a distance of eight feature distances from their original horizontal coordinates and that are at a distance of the second distance from the vertical coordinate axis, and respectively move the seventh constellation point set and the eighth constellation point set to a location in the first quadrant and a location in the fourth quadrant that are at a distance of four feature distances from their original horizontal coordinates and that are at a distance of the first distance from the vertical coordinate axis.

Alternatively, the processor 1402 is further configured to: respectively move the first constellation point set and the second constellation point set to a location in the fourth quadrant and a location in the first quadrant that are at a distance of four feature distances from their original horizontal coordinates and that are at a distance of the first distance from the vertical coordinate axis, respectively move the third constellation point set and the fourth constellation point set to a location in the fourth quadrant and a location in the first quadrant that are at a distance of eight feature distances from their original horizontal coordinates and that are at a distance of the second distance from the vertical coordinate axis, respectively move the fifth constellation point set and the sixth constellation point set to a location in the third quadrant and a location in the second quadrant that are at a distance of four feature distances from their original horizontal coordinates and that are at a distance of the first distance from the vertical coordinate axis, and respectively move the seventh constellation point set and the eighth constellation point set to a location in the third quadrant and a location in the second quadrant that are at a distance of eight feature distances from their original horizontal coordinates and that are at a distance of the second distance from the vertical coordinate axis.

Alternatively, the processor 1402 is further configured to: respectively move the first constellation point set and the second constellation point set to a location in the first quadrant and a location in the fourth quadrant that are at a distance of four feature distances from their original horizontal coordinates and that are at a distance of the first distance from the vertical coordinate axis, respectively move the third constellation point set and the fourth constellation point set to a location in the first quadrant and a location in the fourth quadrant that are at a distance of eight feature distances from their original horizontal coordinates and that are at a distance of the second distance from the vertical coordinate axis, respectively move the fifth constellation point set and the sixth constellation point set to a location in the second quadrant and a location in the third quadrant that are at a distance of four feature distances from their original horizontal coordinates and that are at a distance of the first distance from the vertical coordinate axis, and respectively move the seventh constellation point set and the eighth constellation point set to a location in the second quadrant and a location in the third quadrant that are at a distance of eight feature distances from their original horizontal coordinates and that are at a distance of the second distance from the vertical coordinate axis.

The digital modulation apparatus provided in this embodiment may implement any one of the foregoing described digital modulation methods. A specific implementation process and beneficial effects of this embodiment are similar to those of the foregoing embodiments, and details are not described herein again.

Embodiment 10

Figure 15:
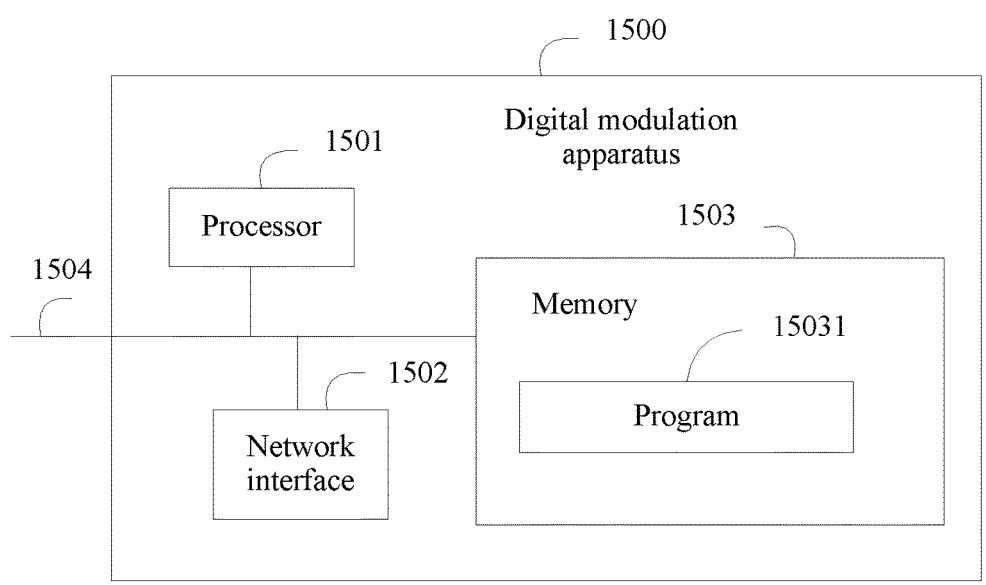
FIG. 15 is a schematic structural diagram of a digital modulation apparatus according to Embodiment 10 of the present disclosure.

The present disclosure further provides a digital modulation apparatus. The digital modulation apparatus may be configured to execute the digital modulation methods in the foregoing embodiments. FIG. 15 is a schematic structural diagram of a digital modulation apparatus according to Embodiment 10 of the present disclosure. As shown in FIG. 15, the digital modulation apparatus 1500 includes at least one processor 1501 (such as a CPU), at least one network interface 1502 or another communications interface, a memory 1503, and at least one communications bus 1504 that is configured to implement a connection and communication between these apparatuses. The processor 1501 is configured to execute an executable module stored in the memory 1503, such as a computer program. The memory 1503 may include a high-speed random access memory (RAM, and may further include a non-volatile memory such as at least one magnetic disk memory. The communication and connection between the digital modulation apparatus and at least one other network element may be implemented through the Internet, a wide area network, a local area network, a metropolitan area network, or the like by using the at least one network interface 1502 (which may be wired or wireless).

In some implementation manners, the memory 1503 stores a program 15031. The program 15031 may be executed by the processor 1501, to be used to: determine to-be-moved constellation points in a rectangular constellation diagram, where constellation points in the rectangular constellation diagram are distributed at corresponding coordinate points in a plane rectangular coordinate system, the to-be-moved constellation points include S columns of constellation points, with absolute values of horizontal coordinates in a descending order, in four quadrants of the plane rectangular coordinate system, and the rectangular constellation diagram is a constellation diagram generated by performing quadrature amplitude modulation QAM on a data bit stream, where S is a quantity of to-be-moved columns in each quadrant; divide to-be-moved constellation points in each of the four quadrants into two constellation point sets according to a bisector of an area between a horizontal coordinate axis and a straight line corresponding to a maximum absolute value of vertical coordinates in the rectangular constellation diagram; and horizontally move and vertically move each constellation point set in the four quadrants, to obtain a cross-shaped constellation diagram.

The processor 1501 may be further configured to: respectively move two constellation point sets in each of the four quadrants to locations that are in a first quadrant group of the four quadrants and that are at a distance of four or eight feature distances from their original horizontal coordinates, respectively move, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and move, to the second quadrant group, two constellation point sets that are in the first quadrant group and in which a minimum vertical coordinate value of one constellation point set is greater than a maximum vertical coordinate value of the other constellation point set. The first quadrant group includes the first quadrant and the fourth quadrant, or the second quadrant and the third quadrant. The second quadrant group includes the first quadrant and the second quadrant, or the third quadrant and the fourth quadrant. The feature distance is a distance between two adjacent constellation points in the rectangular constellation diagram. A difference between the first distance and the second distance is equal to S feature distances. A distance between constellation points with maximum horizontal coordinate values in adjacent constellation point sets in the cross-shaped constellation diagram is equal to S feature distances.

The processor 1501 may be further configured to move a constellation point with a minimum absolute value of a vertical coordinate in each constellation point set in the four quadrants to a location at a distance of one feature distance from a vertical boundary in the rectangular constellation diagram, and keep a relative location between constellation points in each constellation point set in the four quadrants unchanged.

The digital modulation apparatus provided in this embodiment of the present disclosure may implement any one of the foregoing described digital modulation methods. A specific implementation process and beneficial effects of this embodiment are similar to those of the foregoing embodiments, and details are not described herein again.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A digital modulation method, comprising:
   determining to-be-moved constellation points in a rectangular constellation diagram, wherein constellation points in the rectangular constellation diagram are distributed at corresponding coordinate points in a plane rectangular coordinate system, wherein the to-be-moved constellation points comprise S columns of constellation points, with absolute values of horizontal coordinates in a descending order, in four quadrants of the plane rectangular coordinate system, and wherein the rectangular constellation diagram is a constellation diagram generated by performing quadrature amplitude modulation (QAM) on a data bit stream, wherein S is a quantity of to-be-moved columns in each quadrant;
   dividing to-be-moved constellation points in each of the four quadrants into two constellation point sets according to a bisector of an area between a horizontal coordinate axis and a straight line corresponding to a maximum absolute value of vertical coordinates in the rectangular constellation diagram; and
   horizontally moving and vertically moving each constellation point set in the four quadrants, to obtain a cross-shaped constellation diagram,
   wherein the horizontally moving each constellation point set in the four quadrants comprises:
      respectively moving two constellation point sets in each of the four quadrants to locations that are in a first quadrant group of the four quadrants and that are at a distance of four or eight feature distances from original horizontal coordinates of the two constellation point sets,
      respectively moving, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and
      moving, to the second quadrant group, two constellation point sets that are in the first quadrant group and in which a minimum vertical coordinate value of one constellation point set is greater than a maximum vertical coordinate value of the other constellation point set, wherein the first quadrant group comprises the first quadrant and the fourth quadrant, or the second quadrant and the third quadrant, the second quadrant group comprises the first quadrant and the second quadrant, or the third quadrant and the fourth quadrant, the feature distance is a distance between two adjacent constellation points in the rectangular constellation diagram, a difference between the first distance and the second distance is equal to S feature distances, and a distance between constellation points with maximum horizontal coordinate values in adjacent constellation point sets in the cross-shaped constellation diagram is equal to S feature distances; and
   wherein the vertically moving each constellation point set in the four quadrants comprises:
      moving a constellation point with a minimum absolute value of a vertical coordinate in each constellation point set in the four quadrants to a location at a distance of one feature distance from a vertical boundary in the rectangular constellation diagram, and
      keeping a relative location between constellation points in each constellation point set in the four quadrants unchanged.

2. The method according to claim 1, before the determining the to-be-moved constellation points in the rectangular constellation diagram, further comprising:
   obtaining a difference between a column quantity and a row quantity in the rectangular constellation diagram, and
   dividing an absolute value of the difference by four, to obtain the quantity of to-be-moved columns in each quadrant.

3. The method according to claim 1, wherein the dividing the to-be-moved constellation points in each of the four quadrants into two constellation point sets according to the bisector of the area between the horizontal coordinate axis and the straight line corresponding to the maximum absolute value of the vertical coordinates in the rectangular constellation diagram comprises:

dividing to-be-moved constellation points in the first quadrant of the four quadrants to obtain a first constellation point set and a second constellation point set, dividing to-be-moved constellation points in the second quadrant of the four quadrants to obtain a third constellation point set and a fourth constellation point set, dividing to-be-moved constellation points in the third quadrant of the four quadrants to obtain a fifth constellation point set and a sixth constellation point set, and dividing to-be-moved constellation points in the fourth quadrant of the four quadrants to obtain a seventh constellation point set and an eighth constellation point set, according to the bisector of the area between the horizontal coordinate axis and the straight line corresponding to the maximum absolute value of the vertical coordinates in the rectangular constellation diagram.

4. The method according to claim 3, wherein the horizontally moving each constellation point set in the four quadrants further comprises:

respectively moving the first constellation point set and the second constellation point set to a location in the third quadrant and a location in the second quadrant that are at a distance of eight feature distances from original horizontal coordinates of the first constellation point set and the second constellation point set and that are at a distance of the second distance from the vertical coordinate axis, and respectively moving the third constellation point set and the fourth constellation point set to a location in the third quadrant and a location in the second quadrant that are at a distance of four feature distances from original horizontal coordinates of the third constellation point set and the fourth constellation point set and that are at a distance of the first distance from the vertical coordinate axis; and respectively moving the fifth constellation point set and the sixth constellation point set to a location in the fourth quadrant and a location in the first quadrant that are at a distance of eight feature distances from original horizontal coordinates of the fifth constellation point set and the sixth constellation point set and that are at a distance of the second distance from the vertical coordinate axis, and respectively moving the seventh constellation point set and the eighth constellation point set to a location in the fourth quadrant and a location in the first quadrant that are at a distance of four feature distances from original horizontal coordinates of the seventh constellation point set and the eighth constellation point set and that are at a distance of the first distance from the vertical coordinate axis.

5. The method according to claim 3, wherein the horizontally moving each constellation point set in the four quadrants further comprises:

respectively moving the first constellation point set and the second constellation point set to a location in the second quadrant and a location in the third quadrant that are at a distance of eight feature distances from original horizontal coordinates of the first constellation point set and the second constellation point set and that are at a distance of the second distance from the vertical coordinate axis, and respectively moving the third constellation point set and the fourth constellation point set to a location in the second quadrant and a location in the third quadrant that are at a distance of four feature distances from original horizontal coordinates of the third constellation point set and the fourth constellation point set and that are at a distance of the first distance from the vertical coordinate axis; and respectively moving the fifth constellation point set and the sixth constellation point set to a location in the first quadrant and a location in the fourth quadrant that are at a distance of eight feature distances from original horizontal coordinates of the fifth constellation point set and the sixth constellation point set and that are at a distance of the second distance from the vertical coordinate axis, and respectively moving the seventh constellation point set and the eighth constellation point set to a location in the first quadrant and a location in the fourth quadrant that are at a distance of four feature distances from original horizontal coordinates of the seventh constellation point set and the eighth constellation point set and that are at a distance of the first distance from the vertical coordinate axis.

6. The method according to claim 3, wherein the horizontally moving each constellation point set in the four quadrants further comprises:

respectively moving the first constellation point set and the second constellation point set to a location in the fourth quadrant and a location in the first quadrant that are at a distance of four feature distances from original horizontal coordinates of the first constellation point set and the second constellation point set and that are at a distance of the first distance from the vertical coordinate axis, and respectively moving the third constellation point set and the fourth constellation point set to a location in the fourth quadrant and a location in the first quadrant that are at a distance of eight feature distances from original horizontal coordinates of the third constellation point set and the fourth constellation point set and that are at a distance of the second distance from the vertical coordinate axis; and respectively moving the fifth constellation point set and the sixth constellation point set to a location in the third quadrant and a location in the second quadrant that are at a distance of four feature distances from original horizontal coordinates of the fifth constellation point set and the sixth constellation point set and that are at a distance of the first distance from the vertical coordinate axis, and respectively moving the seventh constellation point set and the eighth constellation point set to a location in the third quadrant and a location in the second quadrant that are at a distance of eight feature distances from original horizontal coordinates of the seventh constellation point set and the eighth constellation point set and that are at a distance of the second distance from the vertical coordinate axis.

7. The method according to claim 3, wherein the horizontally moving each constellation point set in the four quadrants further comprises:

respectively moving the first constellation point set and the second constellation point set to a location in the first quadrant and a location in the fourth quadrant that are at a distance of four feature distances from original horizontal coordinates of the first constellation point set and the second constellation point set and that are at a distance of the first distance from the vertical coordinate axis, and respectively moving the third constellation point set and the fourth constellation point set to a location in the first quadrant and a location in the fourth quadrant that are at a distance of eight feature distances from original horizontal coordinates of the third constellation point set and the fourth constellation point set and that are at a distance of the second distance from the vertical coordinate axis; and respectively moving the fifth constellation point set and the sixth constellation point set to a location in the second quadrant and a location in the third quadrant that are at a distance of four feature distances from original horizontal coordinates of the fifth constellation point set and the sixth constellation point set and that are at a distance of the first distance from the vertical coordinate axis, and respectively moving the seventh constellation point set and the eighth constellation point set to a location in the second quadrant and a location in the third quadrant that are at a distance of eight feature distances from original horizontal coordinates of the seventh constellation point set and the eighth constellation point set and that are at a distance of the second distance from the vertical coordinate axis.

8. A digital modulation apparatus, comprising:
a memory storing a program; and
a processor configured to execute the program to cause the digital modulation apparatus to:
determine to-be-moved constellation points in a rectangular constellation diagram, wherein constellation points in the rectangular constellation diagram are distributed at corresponding coordinate points in a plane rectangular coordinate system, the to-be-moved constellation points comprise S columns of constellation points, with absolute values of horizontal coordinates in a descending order, in four quadrants of the plane rectangular coordinate system, and the rectangular constellation diagram is a constellation diagram generated by performing quadrature amplitude modulation (QAM) on a data bit stream, wherein S is a quantity of to-be-moved columns in each quadrant;
divide to-be-moved constellation points in each of the four quadrants into two constellation point sets according to a bisector of an area between a horizontal coordinate axis and a straight line corresponding to a maximum absolute value of vertical coordinates in the rectangular constellation diagram; and
horizontally move and vertically move each constellation point set in the four quadrants, to obtain a cross-shaped constellation diagram,
wherein horizontally moving each constellation point set in the four quadrants comprises:
respectively moving two constellation point sets in each of the four quadrants to locations that are in a first quadrant group of the four quadrants and that are at a distance of four or eight feature distances from original horizontal coordinates of two constellation point sets,
respectively moving, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and
moving, to the second quadrant group, two constellation point sets that are in the first quadrant group and in which a minimum vertical coordinate value of one constellation point set is greater than a maximum vertical coordinate value of the other constellation point set, wherein the first quadrant group comprises the first quadrant and the fourth quadrant, or the second quadrant and the third quadrant, the second quadrant group comprises the first quadrant and the second quadrant, or the third quadrant and the fourth quadrant, the feature distance is a distance between two adjacent constellation points in the rectangular constellation diagram, a difference between the first distance and the second distance is equal to S feature distances, and a distance between constellation points with maximum horizontal coordinate values in adjacent constellation point sets in the cross-shaped constellation diagram is equal to S feature distances; and wherein the vertically moving each constellation point set in the four quadrants comprises:
moving a constellation point with a minimum absolute value of a vertical coordinate in each constellation point set in the four quadrants to a location at a distance of one feature distance from a vertical boundary in the rectangular constellation diagram, and
keeping a relative location between constellation points in each constellation point set in the four quadrants unchanged.

9. The apparatus according to claim 8, wherein executing the program further causes the digital modulation apparatus to:
before the determining the to-be-moved constellation points in the rectangular constellation diagram, obtain a difference between a column quantity and a row quantity in the rectangular constellation diagram, and divide an absolute value of the difference by four, to obtain the quantity of to-be-moved columns in each quadrant.

10. The apparatus according to claim 8, wherein executing the program further causes the digital modulation apparatus to:
divide to-be-moved constellation points in the first quadrant of the four quadrants to obtain a first constellation point set and a second constellation point set,
divide to-be-moved constellation points in the second quadrant of the four quadrants to obtain a third constellation point set and a fourth constellation point set,
divide to-be-moved constellation points in the third quadrant of the four quadrants to obtain a fifth constellation point set and a sixth constellation point set, and
divide to-be-moved constellation points in the fourth quadrant of the four quadrants to obtain a seventh constellation point set and an eighth constellation point set, according to the bisector of the area between the horizontal coordinate axis and the straight line corresponding to the maximum absolute value of the vertical coordinates in the rectangular constellation diagram.

11. The apparatus according to claim 10, wherein executing the program further causes the digital modulation apparatus to:
respectively move the first constellation point set and the second constellation point set to a location in the third quadrant and a location in the second quadrant that are at a distance of eight feature distances from original horizontal coordinates of the first constellation point set and the second constellation point set and that are at a distance of the second distance from the vertical coordinate axis, respectively move the third constellation point set and the fourth constellation point set to a location in the third quadrant and a location in the second quadrant that are at a distance of four feature distances from original horizontal coordinates of the third constellation point set and the fourth constellation point set and that are at a distance of the first distance from the vertical coordinate axis, respectively move the fifth constellation point set and the sixth constellation point set to a location in the fourth quadrant and a location in the first quadrant that are at a distance of eight feature distances from original horizontal coordinates of the fifth constellation point set and the sixth constellation point set and that are at a distance of the second distance from the vertical coordinate axis, and respectively move the seventh constellation point set and the eighth constellation point set to a location in the fourth quadrant and a location in the first quadrant that are at a distance of four feature distances from original horizontal coordinates of the seventh constellation point set and the eighth constellation point set and that are at a distance of the first distance from the vertical coordinate axis.

12. The apparatus according to claim 10, wherein executing the program further causes the digital modulation apparatus to:

respectively move the first constellation point set and the second constellation point set to a location in the second quadrant and a location in the third quadrant that are at a distance of eight feature distances from original horizontal coordinates of the first constellation point set and the second constellation point set and that are at a distance of the second distance from the vertical coordinate axis, respectively move the third constellation point set and the fourth constellation point set to a location in the second quadrant and a location in the third quadrant that are at a distance of four feature distances from original horizontal coordinates of the third constellation point set and the fourth constellation point set and that are at a distance of the first distance from the vertical coordinate axis, respectively move the fifth constellation point set and the sixth constellation point set to a location in the first quadrant and a location in the fourth quadrant that are at a distance of eight feature distances from original horizontal coordinates of the fifth constellation point set and the sixth constellation point set and that are at a distance of the second distance from the vertical coordinate axis, and respectively move the seventh constellation point set and the eighth constellation point set to a location in the first quadrant and a location in the fourth quadrant that are at a distance of four feature distances from original horizontal coordinates of the seventh constellation point set and the eighth constellation point set and that are at a distance of the first distance from the vertical coordinate axis.

13. The apparatus according to claim 10, wherein executing the program further causes the digital modulation apparatus to:

respectively move the first constellation point set and the second constellation point set to a location in the fourth quadrant and a location in the first quadrant that are at a distance of four feature distances from original horizontal coordinates of the first constellation point set and the second constellation point set and that are at a distance of the first distance from the vertical coordinate axis, respectively move the third constellation point set and the fourth constellation point set to a location in the fourth quadrant and a location in the first quadrant that are at a distance of eight feature distances from original horizontal coordinates of the third constellation point set and the fourth constellation point set and that are at a distance of the second distance from the vertical coordinate axis, respectively move the fifth constellation point set and the sixth constellation point set to a location in the third quadrant and a location in the second quadrant that are at a distance of four feature distances from original horizontal coordinates of the fifth constellation point set and the sixth constellation point set and that are at a distance of the first distance from the vertical coordinate axis, and respectively move the seventh constellation point set and the eighth constellation point set to a location in the third quadrant and a location in the second quadrant that are at a distance of eight feature distances from original horizontal coordinates of the seventh constellation point set and the eighth constellation point set and that are at a distance of the second distance from the vertical coordinate axis.

14. The apparatus according to claim 10, wherein executing the program further causes the digital modulation apparatus to:

respectively move the first constellation point set and the second constellation point set to a location in the first quadrant and a location in the fourth quadrant that are at a distance of four feature distances from original horizontal coordinates of the first constellation point set and the second constellation point set and that are at a distance of the first distance from the vertical coordinate axis, respectively move the third constellation point set and the fourth constellation point set to a location in the first quadrant and a location in the fourth quadrant that are at a distance of eight feature distances from original horizontal coordinates of the third constellation point set and the fourth constellation point set and that are at a distance of the second distance from the vertical coordinate axis, respectively move the fifth constellation point set and the sixth constellation point set to a location in the second quadrant and a location in the third quadrant that are at a distance of four feature distances from original horizontal coordinates of the fifth constellation point set and the sixth constellation point set and that are at a distance of the first distance from the vertical coordinate axis, and respectively move the seventh constellation point set and the eighth constellation point set to a location in the second quadrant and a location in the third quadrant that are at a distance of eight feature distances from original horizontal coordinates of the seventh constellation point set and the eighth constellation point set and that are at a distance of the second distance from the vertical coordinate axis.

15. A digital modulation apparatus, comprising:
a receiver, configured to receive a data bit stream and obtain a constellation diagram corresponding to the data bit stream;

a transmitter, configured to obtain a new data bit stream corresponding to cross-shaped constellation diagram which is converted into from the constellation diagram, and transmit the new data bit stream; and a processor, configured to converted the constellation diagram into a cross-shaped constellation diagram, wherein the processor is configured to:
  determine to-be-moved constellation points in the rectangular constellation diagram,
  divide to-be-moved constellation points in each of the four quadrants into two constellation point sets according to a bisector of an area between a horizontal coordinate axis and a straight line corresponding to a maximum absolute value of vertical coordinates in the rectangular constellation diagram, and
  horizontally move and vertically move each constellation point set in the four quadrants, to obtain the cross-shaped constellation diagram,
wherein constellation points in the rectangular constellation diagram are distributed at corresponding coordinate points in a plane rectangular coordinate system, the to-be-moved constellation points comprise S columns of constellation points, with absolute values of horizontal coordinates in a descending order, in the four quadrants of the plane rectangular coordinate system, and the rectangular constellation diagram is a constellation diagram generated by performing quadrature amplitude modulation (QAM) on a data bit stream, wherein S is a quantity of to-be-moved columns in each quadrant;
wherein the horizontally moving each constellation point set in the four quadrants comprises:
  respectively moving two constellation point sets in each of the four quadrants to locations that are in a first quadrant group of the four quadrants and that are at a distance of four or eight feature distances from original horizontal coordinates of two constellation point sets,
  respectively moving, to a location at a distance of a first distance from a vertical coordinate axis and a location at a distance of a second distance from the vertical coordinate axis that are in a quadrant, two constellation point sets that are in a second quadrant group in the four quadrants and in which a minimum vertical coordinate value of one constellation point set is greater than a maximum vertical coordinate value of the other constellation point set, and
  moving, to the second quadrant group, two constellation point sets that are in the first quadrant group and in which a minimum vertical coordinate value of one constellation point set is greater than a maximum vertical coordinate value of the other constellation point set, wherein the first quadrant group comprises the first quadrant and the fourth quadrant, or the second quadrant and the third quadrant, the second quadrant group comprises the first quadrant and the second quadrant, or the third quadrant and the fourth quadrant, the feature distance is a distance between two adjacent constellation points in the rectangular constellation diagram, a difference between the first distance and the second distance is equal to S feature distances, and a distance between constellation points with maximum horizontal coordinate values in adjacent constellation point sets in the cross-shaped constellation diagram is equal to S feature distances; and wherein the vertically moving each constellation point set in the four quadrants comprises:
  moving a constellation point with a minimum absolute value of a vertical coordinate in each constellation point set in the four quadrants to a location at a distance of one feature distance from a vertical boundary in the rectangular constellation diagram, and keep a relative location between constellation points in each constellation point set in the four quadrants unchanged.

16. The apparatus according to claim 15, wherein the processor is further configured to:
  before determining the to-be-moved constellation points in the rectangular constellation diagram, obtain a difference between a column quantity and a row quantity in the rectangular constellation diagram, and divide an absolute value of the difference by four, to obtain the quantity of to-be-moved columns in each quadrant.

17. The apparatus according to claim 15, wherein the processor is further configured to:
  divide to-be-moved constellation points in the first quadrant of the four quadrants to obtain a first constellation point set and a second constellation point set,
  divide to-be-moved constellation points in the second quadrant of the four quadrants to obtain a third constellation point set and a fourth constellation point set,
  divide to-be-moved constellation points in the third quadrant of the four quadrants to obtain a fifth constellation point set and a sixth constellation point set, and
  divide to-be-moved constellation points in the fourth quadrant of the four quadrants to obtain a seventh constellation point set and an eighth constellation point set, according to the bisector of the area between the horizontal coordinate axis and the straight line corresponding to the maximum absolute value of the vertical coordinates in the rectangular constellation diagram.

18. The apparatus according to claim 17, wherein the processor is further configured to:
  respectively move the first constellation point set and the second constellation point set to a location in the third quadrant and a location in the second quadrant that are at a distance of eight feature distances from original horizontal coordinates of the first constellation point set and the second constellation point set and that are at a distance of the second distance from the vertical coordinate axis,
  respectively move the third constellation point set and the fourth constellation point set to a location in the third quadrant and a location in the second quadrant that are at a distance of four feature distances from original horizontal coordinates of the third constellation point set and the fourth constellation point set and that are at a distance of the first distance from the vertical coordinate axis,
  respectively move the fifth constellation point set and the sixth constellation point set to a location in the fourth quadrant and a location in the first quadrant that are at a distance of eight feature distances from original horizontal coordinates of the fifth constellation point set and the sixth constellation point set and that are at a distance of the second distance from the vertical coordinate axis, and
  respectively move the seventh constellation point set and the eighth constellation point set to a location in the fourth quadrant and a location in the first quadrant that are at a distance of four feature distances from original horizontal coordinates of the seventh constellation point set and the eighth constellation point set and that are at a distance of the first distance from the vertical coordinate axis.

19. The apparatus according to claim 17, wherein the processor is further configured to:
respectively move the first constellation point set and the second constellation point set to a location in the second quadrant and a location in the third quadrant that are at a distance of eight feature distances from original horizontal coordinates of the first constellation point set and the second constellation point set and that are at a distance of the second distance from the vertical coordinate axis,
respectively move the third constellation point set and the fourth constellation point set to a location in the second quadrant and a location in the third quadrant that are at a distance of four feature distances from original horizontal coordinates of the third constellation point set and the fourth constellation point set and that are at a distance of the first distance from the vertical coordinate axis,
respectively move the fifth constellation point set and the sixth constellation point set to a location in the first quadrant and a location in the fourth quadrant that are at a distance of eight feature distances from original horizontal coordinates of the fifth constellation point set and the sixth constellation point set and that are at a distance of the second distance from the vertical coordinate axis, and
respectively move the seventh constellation point set and the eighth constellation point set to a location in the first quadrant and a location in the fourth quadrant that are at a distance of four feature distances from original horizontal coordinates of the seventh constellation point set and the eighth constellation point set and that are at a distance of the first distance from the vertical coordinate axis.

20. The apparatus according to claim 17, wherein the processor is further configured to:
respectively move the first constellation point set and the second constellation point set to a location in the fourth quadrant and a location in the first quadrant that are at a distance of four feature distances from original horizontal coordinates of the first constellation point set and the second constellation point set and that are at a distance of the first distance from the vertical coordinate axis,
respectively move the third constellation point set and the fourth constellation point set to a location in the fourth quadrant and a location in the first quadrant that are at a distance of eight feature distances from original horizontal coordinates of the third constellation point set and the fourth constellation point set and that are at a distance of the second distance from the vertical coordinate axis,
respectively move the fifth constellation point set and the sixth constellation point set to a location in the third quadrant and a location in the second quadrant that are at a distance of four feature distances from original horizontal coordinates of the fifth constellation point set and the sixth constellation point set and that are at a distance of the first distance from the vertical coordinate axis, and
respectively move the seventh constellation point set and the eighth constellation point set to a location in the third quadrant and a location in the second quadrant that are at a distance of eight feature distances from original horizontal coordinates of the seventh constellation point set and the eighth constellation point set and that are at a distance of the second distance from the vertical coordinate axis.

21. The apparatus according to claim 17, wherein the processor is further configured to:
respectively move the first constellation point set and the second constellation point set to a location in the first quadrant and a location in the fourth quadrant that are at a distance of four feature distances from original horizontal coordinates of the first constellation point set and the second constellation point set and that are at a distance of the first distance from the vertical coordinate axis,
respectively move the third constellation point set and the fourth constellation point set to a location in the first quadrant and a location in the fourth quadrant that are at a distance of eight feature distances from original horizontal coordinates of the third constellation point set and the fourth constellation point set and that are at a distance of the second distance from the vertical coordinate axis,
respectively move the fifth constellation point set and the sixth constellation point set to a location in the second quadrant and a location in the third quadrant that are at a distance of four feature distances from original horizontal coordinates of the fifth constellation point set and the sixth constellation point set and that are at a distance of the first distance from the vertical coordinate axis, and
respectively move the seventh constellation point set and the eighth constellation point set to a location in the second quadrant and a location in the third quadrant that are at a distance of eight feature distances from original horizontal coordinates of the seventh constellation point set and the eighth constellation point set and that are at a distance of the second distance from the vertical coordinate axis.

* * * * *